(12) United States Patent
Spear et al.

(10) Patent No.: US 8,784,691 B2
(45) Date of Patent: Jul. 22, 2014

(54) CONDUCTIVE COMPOSITES PREPARED USING IONIC LIQUIDS

(75) Inventors: Scott K. Spear, Bankston, AL (US); Daniel T. Daly, Tuscaloosa, AL (US); Rachel M. Frazier, Tuscaloosa, AL (US); Robin D. Rogers, Tuscaloosa, AL (US); Anwarul Haque, Tuscaloosa, AL (US)

(73) Assignee: Board of Trustees of the University of Alabama, Tuscaloosa, AL (US)

( * ) Notice: Subject to any disclaimer, the term of this patent is extended or adjusted under 35 U.S.C. 154(b) by 0 days.

(21) Appl. No.: 13/386,248

(22) PCT Filed: Jul. 19, 2010

(86) PCT No.: PCT/US2010/042440
§ 371 (c)(1),
(2), (4) Date: Jan. 20, 2012

(87) PCT Pub. No.: WO2011/011322
PCT Pub. Date: Jan. 27, 2011

(65) Prior Publication Data
US 2012/0241680 A1      Sep. 27, 2012

Related U.S. Application Data

(60) Provisional application No. 61/228,282, filed on Jul. 24, 2009.

(51) Int. Cl.
*H01B 1/00*      (2006.01)
*H01B 1/12*      (2006.01)

(52) U.S. Cl.
USPC .......................................................... 252/500

(58) Field of Classification Search
USPC .............................................. 252/500, 518.1
See application file for complete search history.

(56) References Cited

U.S. PATENT DOCUMENTS

| 1,943,176 A | | 1/1934 | Graenacher |
| 3,909,195 A | * | 9/1975 | Machell et al. ................ 8/115.7 |

(Continued)

FOREIGN PATENT DOCUMENTS

| CA | 2479941 | 10/2003 |
| CH | 153446 | 6/1932 |

(Continued)

OTHER PUBLICATIONS

International Search Report and Written Opinion for Application No. PCT/US2010/055381 dated Aug. 2, 2011.

(Continued)

*Primary Examiner* — Mark Kopec
*Assistant Examiner* — William Young
(74) *Attorney, Agent, or Firm* — Meunier Carlin & Curfman, LLC

(57) ABSTRACT

Disclosed are conductive composites prepared from ionic liquids, compositions for preparing the composites, and methods of making and using the composites.

24 Claims, 7 Drawing Sheets

(56) References Cited

U.S. PATENT DOCUMENTS

| | | | |
|---|---|---|---|
| 4,063,017 A | 12/1977 | Tsao et al. | |
| 4,097,666 A | 6/1978 | Johnson et al. | |
| 4,188,263 A | 2/1980 | Hulsmann et al. | |
| 4,520,105 A | 5/1985 | Sinner et al. | |
| 4,522,934 A | 6/1985 | Shum et al. | |
| 4,632,750 A | 12/1986 | McGarry | |
| 4,886,625 A * | 12/1989 | Albarella et al. | 252/500 |
| 4,970,156 A | 11/1990 | Avrameas et al. | |
| 5,077,414 A | 12/1991 | Arduengo, III | |
| 5,430,073 A * | 7/1995 | Van Dijk et al. | 522/66 |
| 5,679,146 A | 10/1997 | Kalt et al. | |
| 5,683,832 A | 11/1997 | Bonhote et al. | |
| 5,714,536 A | 2/1998 | Ziolo et al. | |
| 5,747,125 A | 5/1998 | Markulin | |
| 5,792,399 A | 8/1998 | Meister et al. | |
| 5,827,602 A | 10/1998 | Koch et al. | |
| 5,856,513 A | 1/1999 | Ue et al. | |
| 6,376,712 B2 | 4/2002 | Narizuka et al. | |
| 6,451,220 B1 | 9/2002 | Ziolo et al. | |
| 6,528,572 B1 | 3/2003 | Patel et al. | |
| 6,613,310 B1 | 9/2003 | Campbell et al. | |
| 6,808,557 B2 | 10/2004 | Holbrey et al. | |
| 6,824,599 B2 | 11/2004 | Swatloski et al. | |
| 7,005,573 B2 | 2/2006 | Lionetta et al. | |
| 7,253,289 B2 | 8/2007 | Ren et al. | |
| 7,550,520 B2 | 6/2009 | Daly et al. | |
| 2002/0010291 A1 | 1/2002 | Murphy | |
| 2003/0059604 A1 | 3/2003 | Hattori et al. | |
| 2003/0165445 A1 | 9/2003 | Malnou et al. | |
| 2003/0233742 A1 | 12/2003 | Jones et al. | |
| 2004/0077519 A1 | 4/2004 | Price et al. | |
| 2005/0123851 A1 | 6/2005 | Shinbori et al. | |
| 2005/0194561 A1 | 9/2005 | Davis | |
| 2005/0196671 A1 | 9/2005 | Paonessa et al. | |
| 2005/0285073 A1 | 12/2005 | Singh et al. | |
| 2006/0118755 A1 | 6/2006 | Fujioka et al. | |
| 2006/0128996 A1 | 6/2006 | Vaultier et al. | |
| 2006/0194197 A1 | 8/2006 | Spangler et al. | |
| 2006/0226396 A1* | 10/2006 | Majumdar et al. | 252/500 |
| 2007/0006774 A1 | 1/2007 | Rogers et al. | |
| 2007/0112185 A1 | 5/2007 | Myllymaki et al. | |
| 2007/0215300 A1 | 9/2007 | Upfal et al. | |
| 2007/0225191 A1 | 9/2007 | Scheibel et al. | |
| 2008/0023162 A1 | 1/2008 | Myllymaki et al. | |
| 2008/0190013 A1 | 8/2008 | Argyropoulos | |
| 2008/0251768 A1 | 10/2008 | Hsu et al. | |
| 2008/0284950 A1* | 11/2008 | Itoh | 349/96 |
| 2010/0249432 A1 | 9/2010 | Siemer et al. | |

FOREIGN PATENT DOCUMENTS

| | | |
|---|---|---|
| CN | 1380110 | 11/2002 |
| DE | 4308410 | 9/1994 |
| EP | 0780391 | 6/1997 |
| EP | 1222918 | 7/2002 |
| EP | 1854786 | 11/2007 |
| JP | 58183601 | 10/1983 |
| JP | 63056501 | 3/1988 |
| JP | 64017649 | 1/1989 |
| JP | 80089796 | 4/1996 |
| JP | 10265674 | 10/1998 |
| JP | 2002290011 | 10/2002 |
| JP | 2003171144 | 6/2003 |
| JP | 2003335887 | 11/2003 |
| WO | WO9420521 | 9/1994 |
| WO | WO9521871 | 8/1995 |
| WO | WO9606593 | 3/1996 |
| WO | WO0032658 | 6/2000 |
| WO | WO0181436 | 11/2001 |
| WO | WO02079269 | 10/2002 |
| WO | WO02100360 | 12/2002 |
| WO | WO02102586 | 12/2002 |
| WO | WO03029329 | 4/2003 |
| WO | WO03041692 | 5/2003 |
| WO | WO03074031 | 9/2003 |
| WO | WO2004027897 | 4/2004 |
| WO | 2006116126 A2 | 11/2006 |
| WO | WO2007063327 | 6/2007 |
| WO | WO2009105236 | 8/2009 |
| WO | WO2010056790 | 5/2010 |

OTHER PUBLICATIONS

Al-Adhami et al., Immobilization of Wood-Rotting Fungi Laccases on Modified Cellulose and Acrylic Carriers, J. Process Biochemistry, 37:1387-1394 (2002).

Ast et al., Efficient Assembly of Peptomers on Continuous Surfaces, Tetrahedron Lett., 40:4317-4318 (1999).

Bardeletti, Enzyme immobilization on polyethyleneimine-coated magnetite particles, Methods in Biotech. 1, Immobilization of Enzymes and Cells, pp. 133-141 (1997).

Beneventi et al., Polymerization of pyrrole on cellulose fibres using FeCl3 impregnation-pyrrole polymerization sequence, Cellulose, 13(6):725-734 (2006).

Benton et al., Effect of Room-Temperature Ionic Liquids as Replacements for Volatile Organic Solvents in Free-Radical Polymerization, Ionic Liquids, 818:125-133 (2002).

Biedron et al., Ionic Liquids as reaction Media for Polymerization Processes: Atom Transfer Radical Polymerization (ATRP) of Acrylates in Ionic Liquids, Polymer Int'l, 52(10):1584-1588 (2003).

Blankemeyer-Menge et al., Simultaneous Multiple Synthesis of Protected Peptide Fragments on 'Ally'—Functionalized Cellulose Disc Supports, Tetrahedron Lett., 29(46):5871-5874 (1988).

Bonhôte et al., Hydrophobic, Highly Conductive Ambient-Temperature Molten Salts, Inorg. Chem., 35:1168-1178 (1996).

Bora et al., A Simple Method for Functionalization of Cellulose Membrane for Covalent Immoblization of Biomolecules, J. Membr. Sci., 250:215-222 (2005).

Bouzek et al., Platinum distribution and electrocatalytic properties of polypyrrole films, Electrochim. Acta, 46 (5):661-670 (2000).

Chesney et al., Amino-Derivatised Beaded Cellulose Gels, Novel Accessible and Biodegradable Scavenger Resins for Solution Phase Combinatorial Synthesis, Green Chem., 2:57-62 (2000).

Dall' Acqua et al., Performances and properties of intrinsic conductive cellulose-polypyrrole textiles, Synthetic Metals, 146(2):213-221 (2004).

Earle et al., Ionic liquids. Green Solvents for the future, Pure Appl. Chem., 72(7):1391-1398 (2000).

Endres, Ionic Liquids: Solvents for the Eletrodeposition of Metals and Semiconductors, Chem. Phys. Chem., 3 (2):144-154 (2002).

Fannin et al., Properties of 1,3-Dialkylimidazolium Chloride-Aluminum Chloride Ionic Liquids. 2. Phase Transitions, Densities, Electrical Conductivities, and Viscosities, J. Phys. Chem., 88:2614-2621 (1984).

Fischer et al., Structural Changes of Cellulose Dissolved in Molten Salt Hydrates, 219th ACS National Meeting, San Francisco, CA (Mar. 26-30, 2000) (abstract).

Froehner et al., Properties of the Glycoprotein Laccase Immobilized by Two Methods, Acta Chem Scand B, 29:691-694 (1975).

Gelbrich, Colloidal Structures Based on Topochemical Modified Cellulose, Papier (Heidelberg), 52:755-758 (1998).

Gemeiner, Immobilized Enzymes, Organelles and Cells, in Enzyme Engineering, Gemeiner, Ed., Ellis Horwood Series in Biochemistry and Biotechnology, Ellis Horwood Limited: West Sussex, England, pp. 158-179 (1992).

Gordon et al., Fused Organic Salts. 8. Properties of Molten Straight-Chain Isomers of Tetra-n-Pentylammonium Salts, J. Amer. Chem. Soc., 100(24):7445-7454 (1978).

Gregory et al., Conductive textiles, Synthetic Metals, 28:C823-C835 (1989).

Harkin et al., Lignification In Trees: Indication of Exclusive Peroxidase Participation, Science, 180:296-98 (1973).

Heinze et al., Unconventional Methods in Cellulose Functionalization, Prog. Polym. Sci., 26:1689-1762 (2001).

Hirayama, Rapid Confirmation and Revision of the Primary Structure of Bovine Serum Albumin by ESIMS and Frit-FAB LC/MS, Biochem. Biophys. Comm.,173:639-646 (1990).

(56) References Cited

OTHER PUBLICATIONS

Holbrey et al., The Phase Behaviour of 1-Alkyl-3-Methylimidazolium Tetrafluoroborates; Ionic Liquids and Ionic Liquid Crystals, J. Chem. Soc. Dalton Trans., 2133-2139 (1999).
Huddleston et al., Characterization and Comparison of Hydrophilic and Hydrophobic Room Temperature Ionic Liquids Incorporating the Imidazolium Cation, Green Chem., 3:156-164 (2001).
Huddleston et al., Room Temperature Ionic Liquids as Novel Media for 'Clean' Liquid-Liquid Extraction, Chem. Commun., 1765-1766 (1998).
Husemann et al., Homogeneous Acetylation of Cellulose, Buletinul Institutului Politehnic Din Iasi, 16(1-2):47-51 (1970) (abstract).
Illanes et al., Immobilization of Lactase and Invertase on Crosslinked Chitin, in Bioreactor Immobilized Enzymes and Cells, Moo-Young, Ed., Elsevier Applied Science: London, 233-249 (1998).
Illanes, Stability of Biocatalysts, Elec. J. Biotechnol., 2(1):1-9 (1999).
International Search Report and Written Opinion for PCT/US10/42440 dated Sep. 17, 2010.
International Search Report and Written Opinion for PCT/US2009/64105 issued Jan. 13, 2010.
International Search Report and Written Opinion for PCT/US2009/01066 issued Jun. 22, 2009.
International Search Report and Written Opinion for PCT/US2006/24863 issued Jan. 3, 2007.
International Search Report and Written Opinion for PCT/US2006/020941 issued Feb. 27, 2008.
International Search Report and Written Opinion for PCT/US2005/010235 issued Jan. 3, 2007.
Kaynak et al., Conducting nylon, cotton and wool yarns by continuous vapor polymerization of pyrrole, Synthetic Metals, 158:1-5 (2008).
Kaynak et al., Characterization of conductive polypyrrole coated wool yarns, Fibers and Polymers, 3(1):24-30 (2002).
Kim et al., Polypyrrole nanostructures self-assembled in magnetic ionic liquid as a template, Macromolecules, 41:2886-2889 (2008).
Kirk-Othmer, Encyclopedia of Chemical Technology, 4 Ed., 5:476-561 (1993).
Krajewska, Application of Chitin- and Chitosan-based Materials for Enzyme Immobilizations: A Review, Enz. Microb. Techno., 35:126-139 (2004).
Kuhn et al., Toward real applications of conductive polymers, Synthetic Metals, 71:2139-2142 (1995).
Lau et al., Dissolution of *Candida antarctica* Lipase B in Ionic Liquids: Effects on Structure and Activity, Green Chem., 6:483-487 (2004).
Lee et al., Ionic Liquid-Mediated Selective Extraction of Lignin from wood leading to enhanced enzymatic cellulose hydrolysis, Biotech. and Bioeng., 102(5):1368-1376 (2009).
Leipner et al., Structural Changes of Cellulose Dissolved in Molten Salt Hydrates, Macromol. Chem. Phys., 201 (15):2041-2049 (2000).
Liebert et al., Tailored Cellulose Esters: Synthesis and Structure Determination, Biomacromolecules, 6:333-340 (2005).
Linko et al., Cellulose Bead Entrapped Microbial Cells Biotechnical Applications, Enzyme Microb. Technol., 1:26-30 (1979).
Ma et al., Reverse Atom Transfer Radical Polymerization of Methyl Methacrylate in Room-Temperature Ionic Liquids, J. Polymer Sci. Pt. A-Polymer Chem., 41:143-151 (2003).
Maia et al., Cellulose Organic Solvents. 1. The Structure of Anhydrous N-Methylmorpholine N—Oxide and N-Methylmorphline N—Oxide Monohydrate, Acta Cryst., B37:1858-1862 (1981).
Mais et al., Modification of Cellulose Using Cellulose p-Toluene-Sulfonates as Intermediates, Zeszyty Naukowe Politechniki Slaskiej Chemm., 140:121-125 (1999).
Marson et al., A Novel, Efficient Procedure for Acylation of Cellulose Under Homogeneous Solution Conditions, J. Appl. Polymer Sci., 74:1355-1360 (1999).
Martin et al., Anisotropic magnetism in field-structured composites, Phys. Rev. E., 61(3):2818-2830 (2000).
Mazurkiewicz et al., Conducting Polymer Electrochemistry in Ionic Liquids, Synthetic Metals, 135-136:31-32 (2003).
Nara et al., Lipase-Catalysed Polyester Synthesis in 1-Butyl-3-Methylimidazolium Hexafluorophosphate Ionic Liquid, Tetrahedron Lett., 44:1371-1373 (2003).
Ngo et al., Thermal Properties of Imidazolium Ionic Liquids, Thermochimica Acta, 357-358:97-102 (2000).
Ohno et al., A New Type of Polymer Gel Electrolyte: Zwitterionic Liquid/Polar Polymer Mixture, Electrochimica Acta, 48:2079-2083 (2003).
Okamato et al., Synthesis, Spectra, and Reactions of N-Triphenylmethylpyridinium Salts. Reactions of Triphenylmethyl Chlordie with Pyridine Under High Pressure, J. Org. Chem., 35(11):3752-3756 (1970).
Perrier et al., Reversible Addition—Fragmentation Chain Transfer Polymerization of Methacrylate, Acrylate and Styrene Monomers in 1-Alkyl-3-Methylimidazolium Hexflurophosphate, European Polymer J., 39(3):417-422 (2003).
Ren et al., Synthesis of 1-Allyl-3-Methylimidazolium-Based Room Temperature Ionic Liquid and Preliminary Study of its Dissolving Cellulose, Acta Polymerica Sinica, 3:448-451 (2003) (abstract).
Sakai, Determination of Pore Size and Pore Size Distribution 2. Dialysis Membranes, J. Membr. Sci., 96:91-130 (1994).
Shriver et al., Inorganic Chemistry, W. H. Freeman & Co., New York, pp. 406-407 (1990).
Sitze et al., Ionic Liquids Based on FeCl3 and FeCl2. Raman Scattering and ab Initio Calculations, Inorg. Chem., 40:2298-2304 (2001).
Snedden et al., Cross-Linked Polymer-Ionic Liquid Composite Materials, Macromolecules, 36(12):4549-4556 (2003).
Stöllner et al., Activation of Cellulose Membranes with 1,1'-Carbonyldiimidazole or 1-Cyano-4-Dimethylaminopyridinium Tetrafluoroborate as a Basis for the Development of Immunosensors, Anal. Biochem., 304:157-165 (2002).
Suarez et al., Synthesis and Physical-Chemical Properties of Ionic Liquids Based on 1-n-Butyl-3-Methylimidazolium Cation, J. Chim. Phys., 95:1626-1639 (1998).
Sun et al., Magnetite-Embedded Cellulose Fibers Prepared From Ionic Liquid, J. Mat. Chem., 18:283-290 (2008).
Supplemental Search Report for EP4757863 issued May 12, 2009.
Swatloski et al., Dissolution of Cellulose with Ionic Liquids, J. Am. Chem. Soc., 124:4974-4975 (2002).
Swatloski et al., Ionic Liquids for the Dissolution and Regeneration of Cellulose, in Molten Salts XIII: Proceedings of the International Symposium, Trulove, P.C., DeLong, H.C., Mantz, R.A., Stafford, G.R., Matsunaga, M., Eds., The Electrochemical Society: Pennington, NJ, 19:155-164 (2002).
Tiller et al., A Novel Efficient Enzyme-Immobilization Reaction on NH2 Polymers by Means of L-Ascorbic Acid, Biotechnol. Appl. Biochem., 30:155-162 (1999).
Turner et al., Production of Bioactive Cellulose Films Reconstituted from Ionic Liquids, Biomacromolecules, 5:1379-1384 (2004).
Turner, Immobilization of Biocatalysts Using Novel IL-Reconstituted Cellulosic Support Materials, Department of Chemistry, The University of Alabama, presentation on Apr. 19, 2005.
Visser et al., Task Specific Ionic Liquids for the Extraction of Metal Ions from Aqueous Solutions, Chem. Commun., 135-136 (2001).
Weckstrom et al., Entrapment of Whole Cell Yeast β-Galactosidase in Precipitated Cellulose Derivatives, Food Process Eng., vol. 2, Applied Science Publishers Ltd., pp. 148-151 (1979).
Wilkes et al., Air and Water Stable 1-Ethyl-3-methylimidazolium Based Ionic Liquids, J. Chem. Soc. Chem. Commun., 13:965-967 (1992).
Wu et al., Homogeneous Acetylation of Cellulose in a New Ionic Liquid, Biomacromol., 5:266-268 (2004).
Yao et al., Carbon nanotube intramolecular junctions, Nature, 402:273-276 (1999).
Don et al., Physical and Chemical Properties Division, NIST, 230th American Chemical Society Meeting & Exposition. Aug. 28-Sep. 1, 2005 Washington, DC.
Hamaguchi et al., Structure of Ionic Liquids and Ionic Liquid Compounds: Are Ionic Liquids Genuine Liquids in the Conventional Sense?, Adv. Chem. Phys. 2005, 131:85-103.

(56) References Cited

OTHER PUBLICATIONS

Pereiro et al., Physical Properties of 1-Butyl-3-methylimidazolium Methyl Sulfate as a Function of Temperature, J. Chem. Eng. Data 2007, 52:377-380.

Rodriguez et al., Temperature and Composition Dependence of the Density and Viscosity of Binary Mixtures of Water+Ionic Liquid, J. Chem. Eng. Data 2006, 51:2145-2155.

Rogers et al., Ionic Liquids—Solvents of the Future?, Science 2003, 302:792-793.

Seddon, KR, Ionic Liquids for Clean Technology, J. Chem. Tech. Biotech. 1997, 68:351-356.

Zhou et al., Densities and Viscosities of 1-Butyl-3-methylimidazolium Tetrafluoroborate+H2O Binary Mixtures from (303.15 to 353.15) K.

\* cited by examiner

CONDUCTIVE COMPOSITES PREPARED USING IONIC LIQUIDS

CROSS REFERENCE TO RELATED APPLICATIONS

This application, which is a §371 U.S National Phase of International Application No. PCT/US2010/042440, filed Jul. 19, 2010, claims the benefit of priority to U.S. Provisional Application No. 61/228,282 filed on Jul. 24, 2009, the entire disclosure of which is incorporated herein by reference.

FIELD

The subject matter disclosed herein generally relates to conductive composites and to methods of preparing such composites using ionic liquids. Also disclosed are methods of using the composites described herein.

BACKGROUND

During the last decade, the use of conducting polymers has attracted considerable inquiry because of their immense variety of physical and electronic/conductive properties. These conducting polymers have been used in applications ranging from organic transistors and coatings for fuel cells to functional textiles, and electromagnetic shielding. One example of a conducting polymer, polypyrrole (PPy), has a number of useful properties including low resistivity, redox properties, and environmental stability. However, the production of conductive polymer composites, such as fibers, has proved to be difficult. Typically, when a conductive polymer is incorporated into or onto a material, the mechanical properties of the material are diminished.

Thus, there is a need for new methods and compositions for effectively incorporating conductive polymers into materials, particularly materials that are themselves resistive. Disclosed herein are compositions and methods that meet these and other needs.

SUMMARY

In accordance with the purposes of the disclosed materials, compounds, compositions, articles, devices, and methods, as embodied and broadly described herein, the disclosed subject matter, in one aspect, relates to conductive composites comprising a conductive polymer and an electrically resistive material. In a further aspect, the disclosed subject matter relates to methods for making and using the composites.

Additional advantages will be set forth in part in the description that follows, and in part will be obvious from the description, or may be learned by practice of the aspects described below. The advantages described below will be realized and attained by means of the elements and combinations particularly pointed out in the appended claims. It is to be understood that both the foregoing general description and the following detailed description are exemplary and explanatory only and are not restrictive.

BRIEF DESCRIPTION OF THE FIGURES

The accompanying figures, which are incorporated in and constitute a part of this specification, illustrate several aspects described below.

DETAILED DESCRIPTION

Figure 1:
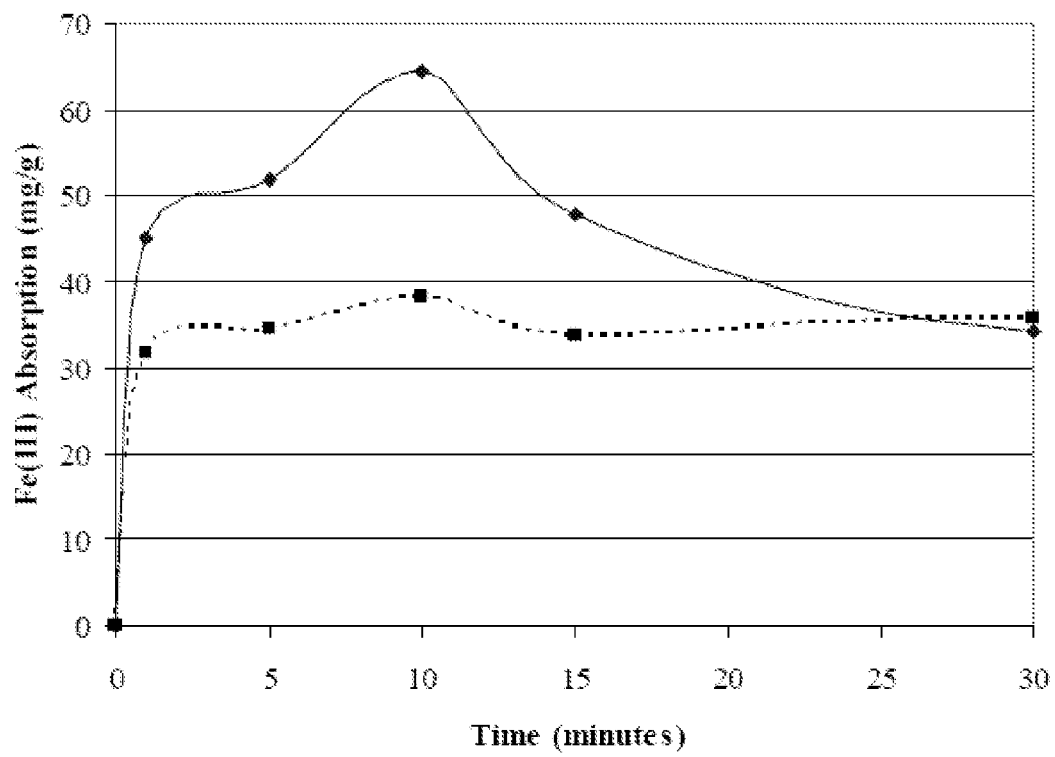
FIG. 1 is a plot of Fe(III) absorption of cotton thread (solid line) and viscose thread (dotted line) versus time at 22° C.

The materials, compounds, compositions, articles, devices, and methods described herein may be understood more readily by reference to the following detailed description of specific aspects of the disclosed subject matter and the Examples included therein and to the Figures.

Before the present materials, compounds, compositions, articles, devices, and methods are disclosed and described, it is to be understood that the aspects described below are not limited to specific synthetic methods or specific reagents, as such may, of course, vary. It is also to be understood that the terminology used herein is for the purpose of describing particular aspects only and is not intended to be limiting.

Also, throughout this specification, various publications are referenced. The disclosures of these publications in their entireties are hereby incorporated by reference into this application in order to more fully describe the state of the art to which the disclosed matter pertains. The references disclosed are also individually and specifically incorporated by reference herein for the material contained in them that is discussed in the sentence in which the reference is relied upon.

GENERAL DEFINITIONS

In this specification and in the claims that follow, reference will be made to a number of terms, which shall be defined to have the following meanings:

Throughout the description and claims of this specification the word "comprise" and other forms of the word, such as "comprising" and "comprises," means including but not limited to, and is not intended to exclude, for example, other additives, components, integers, or steps.

As used in the description and the appended claims, the singular forms "a," "an," and "the" include plural referents unless the context clearly dictates otherwise. Thus, for example, reference to "a composition" includes mixtures of two or more such compositions, reference to "a polymer" includes mixtures of two or more such polymers, reference to "the component" includes mixtures of two or more such component, and the like.

"Optional" or "optionally" means that the subsequently described event or circumstance can or cannot occur, and that the description includes instances where the event or circumstance occurs and instances where it does not.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself For example, if the value "10" is disclosed, then "about 10" is also disclosed. It is also understood that when a value is disclosed that "less than or equal to" the value, "greater than or equal to the value" and possible ranges between values are also disclosed, as appropriately understood by the skilled artisan. For example, if the value "10" is disclosed, then "less than or equal to 10" as well as "greater than or equal to 10" is also disclosed. It is also understood that throughout the application data are provided in a number of different formats and that this data represent endpoints and starting points and ranges for any combination of the data points. For example, if a particular data point "10" and a particular data point "15" are disclosed, it is understood that greater than, greater than or equal to, less than, less than or equal to, and equal to 10 and 15 are considered disclosed as well as between 10 and 15. It is also understood that each unit between two particular units are also disclosed. For example, if 10 and 15 are disclosed, then 11, 12, 13, and 14 are also disclosed.

References in the specification and concluding claims to parts by weight of a particular element or component in a composition denotes the weight relationship between the element or component and any other elements or components in the composition or article for which a part by weight is expressed. Thus, in a compound containing 2 parts by weight of component X and 5 parts by weight component Y, X and Y are present at a weight ratio of 2:5, and are present in such ratio regardless of whether additional components are contained in the compound.

A weight percent (wt. %) of a component, unless specifically stated to the contrary, is based on the total weight of the formulation or composition in which the component is included.

CHEMICAL DEFINITIONS

As used herein, the term "substituted" is contemplated to include all permissible substituents of organic compounds. In a broad aspect, the permissible substituents include acyclic and cyclic, branched and unbranched, carbocyclic and heterocyclic, and aromatic and nonaromatic substituents of organic compounds. Illustrative substituents include, for example, those described below. The permissible substituents can be one or more and the same or different for appropriate organic compounds. For purposes of this disclosure, the heteroatoms, such as nitrogen, can have hydrogen substituents and/or any permissible substituents of organic compounds described herein which satisfy the valencies of the heteroatoms. This disclosure is not intended to be limited in any manner by the permissible substituents of organic compounds. Also, the terms "substitution" or "substituted with" include the implicit proviso that such substitution is in accordance with permitted valence of the substituted atom and the substituent, and that the substitution results in a stable compound, e.g., a compound that does not spontaneously undergo transformation such as by rearrangement, cyclization, elimination, etc.

"$A^1$," "$A^2$," "$A^3$," and "$A^4$" are used herein as generic symbols to represent various specific substituents. These symbols can be any substituent, not limited to those disclosed herein, and when they are defined to be certain substituents in one instance, they can, in another instance, be defined as some other substituents.

The term "alkyl" as used herein is a branched or unbranched saturated hydrocarbon group of 1 to 24 carbon atoms, such as methyl, ethyl, n-propyl, isopropyl, n-butyl, isobutyl, t-butyl, pentyl, hexyl, heptyl, octyl, nonyl, decyl, dodecyl, tetradecyl, hexadecyl, eicosyl, tetracosyl, and the like. The alkyl group can also be substituted or unsubstituted. The alkyl group can be substituted with one or more groups including, but not limited to, alkyl, halogenated alkyl, alkoxy, alkenyl, alkynyl, aryl, heteroaryl, aldehyde, amino, carboxylic acid, ester, ether, halide, hydroxy, ketone, nitro, silyl, sulfo-oxo, sulfonyl, sulfone, sulfoxide, or thiol, as described below.

Throughout the specification "alkyl" is generally used to refer to both unsubstituted alkyl groups and substituted alkyl groups; however, substituted alkyl groups are also specifically referred to herein by identifying the specific substituent(s) on the alkyl group. For example, the term "halogenated alkyl" specifically refers to an alkyl group that is substituted with one or more halide, e.g., fluorine, chlorine, bromine, or iodine. The term "alkoxyalkyl" specifically refers to an alkyl group that is substituted with one or more alkoxy groups, as described below. The term "alkylamino" specifically refers to an alkyl group that is substituted with one or more amino groups, as described below, and the like. When "alkyl" is used in one instance and a specific term such as "alkylalcohol" is used in another, it is not meant to imply that the term "alkyl" does not also refer to specific terms such as "alkylalcohol" and the like.

This practice is also used for other groups described herein. That is, while a term such as "cycloalkyl" refers to both unsubstituted and substituted cycloalkyl moieties, the substituted moieties can, in addition, be specifically identified herein; for example, a particular substituted cycloalkyl can be referred to as, e.g., an "alkylcycloalkyl." Similarly, a substituted alkoxy can be specifically referred to as, e.g., a "halogenated alkoxy," a particular substituted alkenyl can be, e.g., an "alkenylalcohol," and the like. Again, the practice of using a general term, such as "cycloalkyl," and a specific term, such as "alkylcycloalkyl," is not meant to imply that the general term does not also include the specific term.

The term "alkoxy" as used herein is an alkyl group bound through a single, terminal ether linkage; that is, an "alkoxy" group can be defined as —$OA^1$ where $A^1$ is alkyl as defined above.

The term alkoxyalkyl as used herein is an alkyl group that contains an alkoxy substituent and can be defined as -$A^1$-O-$A^2$, where $A^1$ and $A^2$ are alkyl groups.

The term "alkenyl" as used herein is a hydrocarbon group of from 2 to 24 carbon atoms with a structural formula containing at least one carbon-carbon double bond. Asymmetric structures such as ($A^1A^2$)C=C($A^3A^4$) are intended to include both the E and Z isomers. This may be presumed in structural formulae herein wherein an asymmetric alkene is present, or it may be explicitly indicated by the bond symbol C=C. The alkenyl group can be substituted with one or more groups including, but not limited to, alkyl, halogenated alkyl, alkoxy, alkenyl, alkynyl, aryl, heteroaryl, aldehyde, amino, carboxylic acid, ester, ether, halide, hydroxy, ketone, nitro, silyl, sulfo-oxo, sulfonyl, sulfone, sulfoxide, or thiol, as described below.

The term "alkynyl" as used herein is a hydrocarbon group of 2 to 24 carbon atoms with a structural formula containing at least one carbon-carbon triple bond. The alkynyl group can be substituted with one or more groups including, but not limited to, alkyl, halogenated alkyl, alkoxy, alkenyl, alkynyl, aryl, heteroaryl, aldehyde, amino, carboxylic acid, ester, ether, halide, hydroxy, ketone, nitro, silyl, sulfo-oxo, sulfonyl, sulfone, sulfoxide, or thiol, as described below.

The term "aryl" as used herein is a group that contains any carbon-based aromatic group including, but not limited to, benzene, naphthalene, phenyl, biphenyl, phenoxybenzene, and the like. The term "aryl" also includes "heteroaryl," which is defined as a group that contains an aromatic group that has at least one heteroatom incorporated within the ring of the aromatic group. Examples of heteroatoms include, but are not limited to, nitrogen, oxygen, sulfur, and phosphorus. Likewise, the term "non-heteroaryl," which is also included in the term "aryl," defines a group that contains an aromatic group that does not contain a heteroatom. The aryl group can be substituted or unsubstituted. The aryl group can be substituted with one or more groups including, but not limited to, alkyl, halogenated alkyl, alkoxy, alkenyl, alkynyl, aryl, heteroaryl, aldehyde, amino, carboxylic acid, ester, ether, halide, hydroxy, ketone, nitro, silyl, sulfo-oxo, sulfonyl, sulfone, sulfoxide, or thiol as described herein. The term "biaryl" is a specific type of aryl group and is included in the definition of aryl. Biaryl refers to two aryl groups that are bound together via a fused ring structure, as in naphthalene, or are attached via one or more carbon-carbon bonds, as in biphenyl.

The term "cycloalkyl" as used herein is a non-aromatic carbon-based ring composed of at least three carbon atoms. Examples of cycloalkyl groups include, but are not limited to, cyclopropyl, cyclobutyl, cyclopentyl, cyclohexyl, etc. The term "heterocycloalkyl" is a cycloalkyl group as defined above where at least one of the carbon atoms of the ring is substituted with a heteroatom such as, but not limited to, nitrogen, oxygen, sulfur, or phosphorus. The cycloalkyl group and heterocycloalkyl group can be substituted or unsubstituted. The cycloalkyl group and heterocycloalkyl group can be substituted with one or more groups including, but not limited to, alkyl, alkoxy, alkenyl, alkynyl, aryl, heteroaryl, aldehyde, amino, carboxylic acid, ester, ether, halide, hydroxy, ketone, nitro, silyl, sulfo-oxo, sulfonyl, sulfone, sulfoxide, or thiol as described herein.

The term "cycloalkenyl" as used herein is a non-aromatic carbon-based ring composed of at least three carbon atoms and containing at least one double bound, i.e., C=C. Examples of cycloalkenyl groups include, but are not limited to, cyclopropenyl, cyclobutenyl, cyclopentenyl, cyclopentadienyl, cyclohexenyl, cyclohexadienyl, and the like. The term "heterocycloalkenyl" is a type of cycloalkenyl group as defined above, and is included within the meaning of the term "cycloalkenyl," where at least one of the carbon atoms of the ring is substituted with a heteroatom such as, but not limited to, nitrogen, oxygen, sulfur, or phosphorus. The cycloalkenyl group and heterocycloalkenyl group can be substituted or unsubstituted. The cycloalkenyl group and heterocycloalkenyl group can be substituted with one or more groups including, but not limited to, alkyl, alkoxy, alkenyl, alkynyl, aryl, heteroaryl, aldehyde, amino, carboxylic acid, ester, ether, halide, hydroxy, ketone, nitro, silyl, sulfo-oxo, sulfonyl, sulfone, sulfoxide, or thiol as described herein.

The term "cyclic group" is used herein to refer to either aryl groups, non-aryl groups (i.e., cycloalkyl, heterocycloalkyl, cycloalkenyl, and heterocycloalkenyl groups), or both. Cyclic groups have one or more ring systems that can be substituted or unsubstituted. A cyclic group can contain one or more aryl groups, one or more non-aryl groups, or one or more aryl groups and one or more non-aryl groups.

The term "aldehyde" as used herein is represented by the formula —C(O)H. Throughout this specification "C(O)" is a short hand notation for C=O.

The terms "amine" or "amino" as used herein are represented by the formula $NA^1A^2A^3$, where $A^1$, $A^2$, and $A^3$ can be, independently, hydrogen, an alkyl, halogenated alkyl, alkenyl, alkynyl, aryl, heteroaryl, cycloalkyl, cycloalkenyl, heterocycloalkyl, or heterocycloalkenyl group described above.

The term "carboxylic acid" as used herein is represented by the formula —C(O)OH. A "carboxylate" as used herein is represented by the formula —C(O)O⁻.

The term "ester" as used herein is represented by the formula —OC(O)$A^1$ or —C(O)O$A^1$, where $A^1$ can be an alkyl, halogenated alkyl, alkenyl, alkynyl, aryl, heteroaryl, cycloalkyl, cycloalkenyl, heterocycloalkyl, or heterocycloalkenyl group described above.

The term "ether" as used herein is represented by the formula $A^1OA^2$, where $A^1$ and $A^2$ can be, independently, an alkyl, halogenated alkyl, alkenyl, alkynyl, aryl, heteroaryl, cycloalkyl, cycloalkenyl, heterocycloalkyl, or heterocycloalkenyl group described above.

The term "ketone" as used herein is represented by the formula $A^1C(O)A^2$, where $A^1$ and $A^2$ can be, independently, an alkyl, halogenated alkyl, alkenyl, alkynyl, aryl, heteroaryl, cycloalkyl, cycloalkenyl, heterocycloalkyl, or heterocycloalkenyl group described above.

The term "halide" as used herein refers to the halogens fluorine, chlorine, bromine, and iodine.

The term "hydroxyl" as used herein is represented by the formula —OH.

The term "nitro" as used herein is represented by the formula —$NO_2$.

The term "silyl" as used herein is represented by the formula —Si$A^1A^2A^3$, where $A^1$, $A^2$, and $A^3$ can be, independently, hydrogen, alkyl, halogenated alkyl, alkoxy, alkenyl, alkynyl, aryl, heteroaryl, cycloalkyl, cycloalkenyl, heterocycloalkyl, or heterocycloalkenyl group described above.

The term "sulfo-oxo" as used herein is represented by the formulas —S(O)$A^1$, —S(O)$_2A^1$, —OS(O)$_2A^1$, or —OS(O)$_2$O$A^1$, where $A^1$ can be hydrogen, an alkyl, halogenated alkyl, alkenyl, alkynyl, aryl, heteroaryl, cycloalkyl, cycloalkenyl, heterocycloalkyl, or heterocycloalkenyl group described above. Throughout this specification "S(O)" is a short hand notation for S=O The term "sulfonyl" is used herein to refer to the sulfo-oxo group represented by the formula —S(O)$_2A^1$, where $A^1$ can be hydrogen, an alkyl, halogenated alkyl, alkenyl, alkynyl, aryl, heteroaryl, cycloalkyl, cycloalkenyl, heterocycloalkyl, or heterocycloalkenyl group described above.

The term "sulfonylamino" or "sulfonamide" as used herein is represented by the formula —S(O)$_2$NH—.

The term "sulfone" as used herein is represented by the formula $A^1S(O)_2A^2$, where $A^1$ and $A^2$ can be, independently, an alkyl, halogenated alkyl, alkenyl, alkynyl, aryl, heteroaryl, cycloalkyl, cycloalkenyl, heterocycloalkyl, or heterocycloalkenyl group described above.

The term "sulfoxide" as used herein is represented by the formula $A^1S(O)A^2$, where $A^1$ and $A^2$ can be, independently, an alkyl, halogenated alkyl, alkenyl, alkynyl, aryl, heteroaryl, cycloalkyl, cycloalkenyl, heterocycloalkyl, or heterocycloalkenyl group described above.

The term "thiol" as used herein is represented by the formula —SH.

"$R^1$," "$R^2$," "$R^3$," "$R^n$," where n is an integer, as used herein can, independently, possess one or more of the groups listed above. For example, if $R^1$ is a straight chain alkyl group, one of the hydrogen atoms of the alkyl group can optionally be substituted with a hydroxyl group, an alkoxy group, an alkyl group, a halide, and the like. Depending upon the groups that are selected, a first group can be incorporated within second group or, alternatively, the first group can be pendant (i.e., attached) to the second group. For example, with the phrase "an alkyl group comprising an amino group," the amino group can be incorporated within the backbone of the alkyl group. Alternatively, the amino group can be attached to the backbone of the alkyl group. The nature of the group(s) that is (are) selected will determine if the first group is embedded or attached to the second group.

Unless stated to the contrary, a formula with chemical bonds shown only as solid lines and not as wedges or dashed lines contemplates each possible isomer, e.g., each enantiomer and diastereomer, and a mixture of isomers, such as a racemic or scalemic mixture.

Reference will now be made in detail to specific aspects of the disclosed materials, compounds, compositions, articles, and methods, examples of which are illustrated in the accompanying Examples and Figures.

Materials and Compositions

Certain materials, compounds, compositions, and components disclosed herein can be obtained commercially or readily synthesized using techniques generally known to those of skill in the art. For example, the starting materials and reagents used in preparing the disclosed compounds and compositions are either available from commercial suppliers such as Aldrich Chemical Co., (Milwaukee, Wis.), Acros Organics (Morris Plains, N.J.), Fisher Scientific (Pittsburgh, Pa.), or Sigma (St. Louis, Mo.) or are prepared by methods known to those skilled in the art following procedures set forth in references such as Fieser and Fieser's Reagents for Organic Synthesis, Volumes 1-17 (John Wiley and Sons, 1991); Rodd's Chemistry of Carbon Compounds, Volumes 1-5 and Supplementals (Elsevier Science Publishers, 1989); Organic Reactions, Volumes 1-40 (John Wiley and Sons, 1991); March's Advanced Organic Chemistry, (John Wiley and Sons, 4th Edition); and Larock's Comprehensive Organic Transformations (VCH Publishers Inc., 1989).

Also, disclosed herein are materials, compounds, compositions, and components that can be used for, can be used in conjunction with, can be used in preparation for, or are products of the disclosed methods and compositions. These and other materials are disclosed herein, and it is understood that when combinations, subsets, interactions, groups, etc. of these materials are disclosed that while specific reference of each various individual and collective combinations and permutation of these compounds may not be explicitly disclosed, each is specifically contemplated and described herein. For example, if a composition is disclosed and a number of modifications that can be made to a number of components of the composition are discussed, each and every combination and permutation that are possible are specifically contemplated unless specifically indicated to the contrary. Thus, if a class of components A, B, and C are disclosed as well as a class of components D, E, and F and an example of a composition A-D is disclosed, then even if each is not individually recited, each is individually and collectively contemplated. Thus, in this example, each of the combinations A-E, A-F, B-D, B-E, B-F, C-D, C-E, and C—F are specifically contemplated and should be considered disclosed from disclosure of A, B, and C; D, E, and F; and the example combination A-D. Likewise, any subset or combination of these is also specifically contemplated and disclosed. Thus, for example, the sub-group of A-E, B-F, and C-E are specifically contemplated and should be considered disclosed from disclosure of A, B, and C; D, E, and F; and the example combination A-D. This concept applies to all aspects of this disclosure including, but not limited to, steps in methods of making and using the disclosed compositions. Thus, if there are a variety of additional steps that can be performed it is understood that each of these additional steps can be performed with any specific aspect or combination of aspects of the disclosed methods, and that each such combination is specifically contemplated and should be considered disclosed.

In one aspect, disclosed herein conductive composites. The composites can be prepared conveniently using ionic liquids. It should be appreciated that ionic liquids can both dissolve electrically resistive materials, including materials such as fibers comprising cellulose, as well as serve as a solvent to polymerize conductive polymer precursors, such as pyrrole. The disclosed subject matter also provides methods for coating electrically resistive materials, such as fibers, with a catalyst that can be used to polymerize conductive polymer precursors to thereby provide a cellulose material that is coated with conductive polymers.

Composites

The composites disclosed herein generally comprise an electrically resistive material and a conductive polymer. The particular relationship between the conductive polymer and electrically resistive material can be difficult to specifically define. For example, the conductive polymer can be adsorbed and/or absorbed into and/or onto the electrically resistive material. Alternatively, the electrically resistive material can be adsorbed and/or absorbed into and/or onto the conductive polymer. In certain aspects, the conductive polymer is in or on the electrically resistive material. In a further aspect, the conductive polymer is present on an outer surface of the electrically resistive material. For example, an electrically resistive fiber, such as cotton, can have the conductive polymer on at least a portion of the outer surface of the fiber. In a specific aspect, the composite comprises a cellulose containing fiber as the electrically resistive material and polypyrrole as the conductive polymer. In this aspect, the polypyrrole can be on at least a portion of the outer surface of the cellulose fiber. Still further the composites can be described as blends of conductive polymers and electrically resistive material.

The conductive polymer provides conductivity to the composite, thereby reducing the electrical resistance of the electrically resistive material and the composite as a whole. Thus, the composites will typically have an electrical resistivity that is less than the electrical resistivity of the electrically resistive material, prior to forming the composite. In some aspects, the composites have a resistance of less than about 5 k$\Omega$ at 1 cm, less than about 4 k$\Omega$ at 1 cm, or even less than about 3.5 k$\Omega$ at 1 cm, including for example, about 3 k$\Omega$ at 1 cm at room temperature.

Electrically Resistive Material

The electrically resistive materials generally include those materials that oppose the passage of electrical current therethrough. The electrically resistive materials will typically have relatively high electrical resistance values. For example, an exemplary electrically resistive material has an electrical resistance of at least 500 k$\Omega$ at 1 cm at room temperature, at least 800 k$\Omega$ at 1 cm at room temperature, at least 900 k$\Omega$ at 1 cm at room temperature, or at least 1,000 k$\Omega$ at 1 cm at room temperature. As a specific example, an exemplary cotton fiber has an electrical resistance of about 1518 k$\Omega$ at 1 cm at room temperature.

Preferred electrically resistive materials include natural materials, such as naturally occurring fibers. Specific examples include without limitation cotton, wool, silk, hemp, flax, or other natural fibers. Such natural fibers are particularly suitable for use with the methods and compositions disclosed herein because they typically comprise hard to dissolve materials. For example, cotton comprises cellulose, which is difficult to dissolve.

In addition to natural materials, other electrically resistive materials that can be used include nylon, TEFLON™, KEVLAR™, polyisophthalamide, optionally substituted polyesters, optionally substituted polystyrenes, optionally substituted polyethylenes and polypropylenes.

Electrical resistance of both the electrically resistive material and the composite can be measured using methods known in the art. For example, electrical resistance can be measured using a digital multimeter, such as a Fluke 112 multimeter (Fluke, Everett, Wash., U.S.A.). As a specific example, one end of a multimeter can be placed at a point on an electrically resistive material, such as a fiber, and the other end can be placed approximately 1 cm away. The resistance can then be measured and recorded.

Conductive Polymer

As discussed above, the composite comprises a conductive polymer. The conductive polymer can be in or on the electrically resistive material, for example on at least a portion of an external surface of a fiber. Because the conductive polymer is at least a partial conductor, it allows current to flow through the composite, by way of the conductive polymer.

Polymerizable monomers include pyrrole, N-methylpyrrole, aniline, acetylene, thiophene, phenylene, and phenylene sulfide.

Preferably, the conductive polymer is polypyrrole, which has a structure represented by the formula:

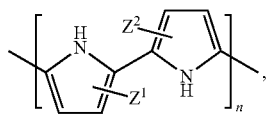

wherein n is an integer from 2 to 100,000, and $Z^1$ and $Z^2$ are independently selected from alkyl, alkenyl, alkynyl, alkoxy, amino, and halogen. Polypyrrole can be prepared by polymerizing pyrrole in a polar solution, such as ionic liquid or water. The polymerization can be accomplished, for example, using a transition metal catalyst, such as Fe(III). Other examples of conductive polymers are polyaniline (PANI), as shown below.

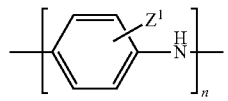

wherein n is an integer from 2 to 100,000, and $Z^1$ is selected from alkyl, alkenyl, alkynyl, alkoxy, amino, and halogen.

There are also other electrically conducting polymers that are used in transistors, light emitting diodes, photovoltaics and other devices. These can be used herein and include 2-(4-tert-butylphenyl)-5-(4-biphenylyl)-1,3,4-oxadiazole, 1,3,5-tris(2-(9-ethylcabazyl-3)ethylene)benzene, 1,3,5-tris[3-methylphenyl)phenylamino]benzene, 1,4-bis(5 diphenylamino)benzene, 4,4'-bis(Ncarbozolyl)-1,1'-biphenyl, 4-(diethylamino)benzaldehyde diphenylhydrazone, 9-ethyl-3-carbazolecarboxaldehyde diphenylhydrazone, Copper(II) phthalocyanine, N,N'-bis(3-methylphenyl)-N,N'-diphenyl-benzidine, N,N'-di-[(1-napthyl)-N,N'-diphenyl]-1,1'-biphenyl)-4,4'diamine, N,N'-diphenyl-N,N'di-p-tolylbenzene-1,4-diamine, poly(copper10 phthalocyanine), tetra-N-phenylbenzidine, titanyl phthalocyanine, titanyl phthalocyanine β-modification, tri-p-tolylamine, tris(4-carbozoyl-9-ylphenyl)amine, tris[4-(diethylamino)phenyl] amine, 2-(4-biphenylyl)-5-phenyl-1,3,4-oxadiazole, 2-(4-tertbutylphenyl)-5-5(4-biphenylyl)-1,3,4-oxadiazole, 3,5-Bis(4-tert-butylphenyl)-4-phenyl-4H-1,2,4-triazole, 3-(biphenyl-4-yl)-5-(4-tert-butylphenyl)-4-phenyl-4H-1,2, 4-triazole, 15 Bathocuproine, Bathophenanthroline, and Tris-(8-hydroxyquinoline)aluminum, 2,3,5,6-Tetrafluoro-7,7,8,8-tetracyanoquinodimethane, 2-[4-((4-(Bis(2-hydroxyethyl)amino)phenyl)(cyano)methylene)-2,5-cyclohexadien-1-ylidene]malonitrile,7,7,8,8-Tetracyanoquinodimethane.

Compositions

The compositions disclosed herein can be used, inter alia, to prepare the disclosed composites. The disclosed compositions generally comprise one or more ionic liquids and the electrically resistive material. The disclosed compositions can also comprise the conductive polymer precursor and/or the conductive polymer.

The ionic liquid can serve a variety of purposes. For example, the ionic liquid can both dissolve the electrically resistive material, which can be a hard-to-dissolve material, such as a natural fiber. The ionic liquid can also serve as the medium for forming the conductive polymer. That is, the composite can be formed by polymerizing the conductive polymer precursor in a composition comprising the ionic liquid and the electrically resistive material.

In a specific aspect, the ionic liquid can comprise a catalyst that is suitable for polymerizing the conductive polymer precursor. For example, the anionic portion of the ionic liquid can comprise a transition metal catalyst, such as Fe(III), which can serve as a catalyst for polymerizing a conductive polymer precursor, such a pyrrole.

Ionic Liquids

A variety of ionic liquids can be used to prepare the composite disclosed herein. Generally, the ionic liquids contain ionized species (i.e., cations and anions) and have melting points usually below about 150° C. In some cases the ionic liquids are organic salts containing one or more cations that are typically ammonium, imidazolium, or pyridinium ions, although many other types are known and disclosed herein.

In one aspect, the ionic liquid used herein can be substantially free of water, a water- or alcohol-miscible organic solvent, or nitrogen-containing base. Contemplated organic solvents of which the ionic liquid is free include solvents such as dimethyl sulfoxide, dimethyl formamide, acetamide, hexamethyl phosphoramide, water-soluble alcohols, ketones or aldehydes such as ethanol, methanol, 1- or 2-propanol, tert-butanol, acetone, methyl ethyl ketone, acetaldehyde, propionaldehyde, ethylene glycol, propylene glycol, the $C_1$-$C_4$ alkyl and alkoxy ethylene glycols and propylene glycols such as 2-methoxyethanol, 2-ethoxyethanol, 2-butoxyethanol, diethyleneglycol, and the like.

A cation of an ionic liquid can be cyclic and correspond in structure to a formula shown below:

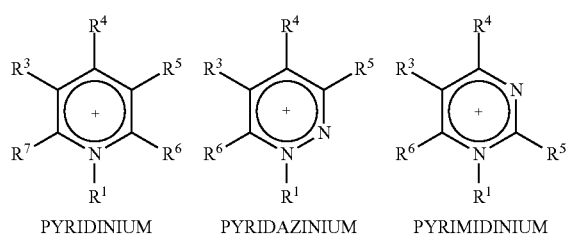

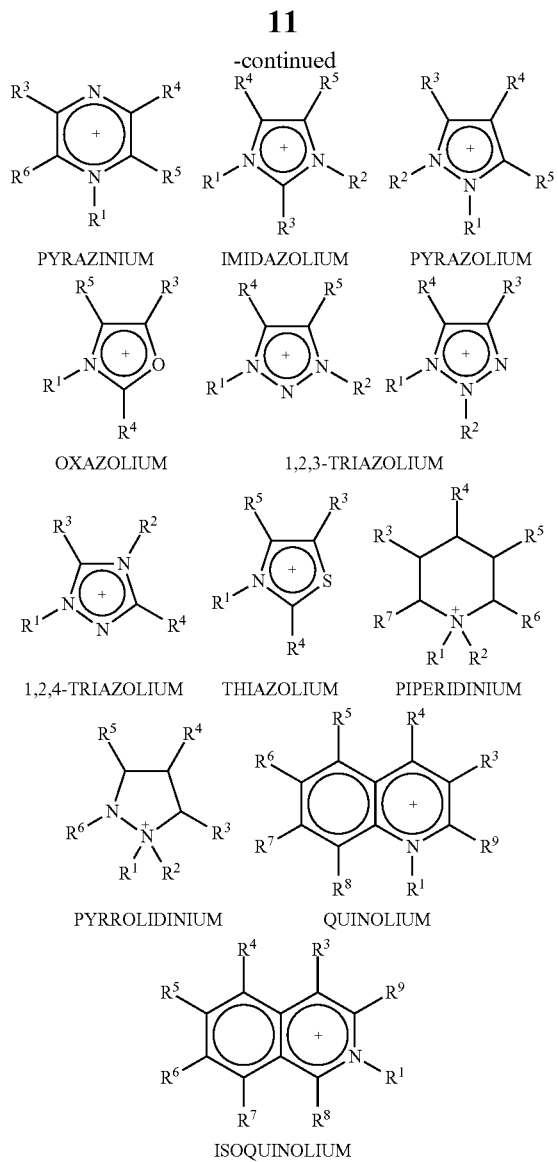

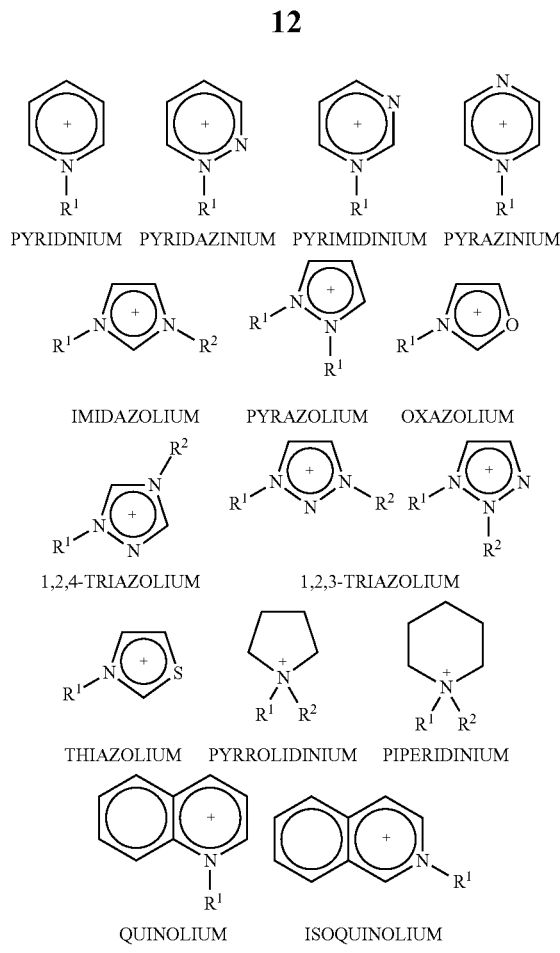

wherein $R^1$ and $R^2$ are independently a $C_1$-$C_6$ alkyl group or a $C_1$-$C_6$ alkoxyalkyl group, and $R^3$, $R^4$, $R^5$, $R^6$, $R^7$, $R^8$, and $R^9$ ($R^3$-$R^9$), when present, are independently H, a $C_1$-$C_6$ alkyl, a $C_1$-$C_6$ alkoxyalkyl group, or a $C_1$-$C_6$ alkoxy group. In other examples, both $R^1$ and $R^2$ groups are $C_1$-$C_4$ alkyl, with one being methyl, and $R^3$-$R^9$, when present, are H. Exemplary $C_1$-$C_6$ alkyl groups and $C_1$-$C_4$ alkyl groups include methyl, ethyl, propyl, iso-propyl, butyl, sec-butyl, iso-butyl, pentyl, iso-pentyl, hexyl, 2-ethylbutyl, 2-methylpentyl, and the like. Corresponding $C_1$-$C_6$ alkoxy groups contain the above $C_1$-$C_6$ alkyl group bonded to an oxygen atom that is also bonded to the cation ring. An alkoxyalkyl group contains an ether group bonded to an alkyl group, and here contains a total of up to six carbon atoms. It is to be noted that there are two isomeric 1,2,3-triazoles. In some examples, all R groups not required for cation formation can be H.

In one example, all R groups that are not required for cation formation; i.e., those other than $R^1$ and $R^2$ for compounds other than the imidazolium, pyrazolium, and triazolium cations shown above, are H. Thus, the cations shown above can have a structure that corresponds to a structure shown below, wherein $R^1$ and $R^2$ are as described before.

A cation that contains a single five-membered ring that is free of fusion to other ring structures is suitable for use herein. Exemplary cations are illustrated below wherein $R^1$, $R^2$, and $R^3$-$R^5$, when present, are as defined before.

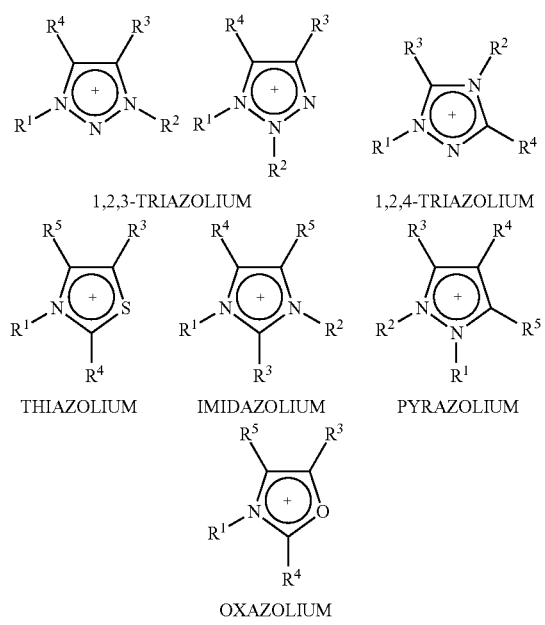

Of the cations that contain a single five-membered ring free of fusion to other ring structures, an imidazolium cation that corresponds in structure to Formula A is also suitable, wherein $R^1$, $R^2$, and $R^3$-$R^5$, are as defined before.

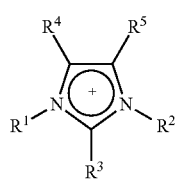

(A)

In a further example, an N,N-1,3-di-($C_1$-$C_6$ alkyl)-substituted-imidazolium ion can be used; i.e., an imidazolium cation wherein $R^3$-$R^5$ of Formula A are each H, and $R^1$ and $R^2$ are independently each a $C_1$-$C_6$ alkyl group or a $C_1$-$C_6$ alkoxyalkyl group. In still other examples, a 1-($C_1$-$C_6$-alkyl)-3-(methyl)-imidazolium [$C_n$-mim, where n=1-6] cation and a halogen anion can be used. In yet another example, the cation illustrated by a compound that corresponds in structure to Formula B, below, wherein $R^3$-$R^5$ of Formula A are each hydrido and $R^1$ is a $C_1$-$C_6$-alkyl group or a $C_1$-$C_6$ alkoxyalkyl group.

(B)

The disclosed ionic liquids can be liquid at or below a temperature of about 150° C., for example, at or below a temperature of about 100° C. and at or above a temperature of about minus 100° C. For example, N-alkylisoquinolinium and N-alkylquinolinium halide salts have melting points of less than about 150° C. The melting point of N-methylisoquinolinium chloride is 183° C., and N-ethylquinolinium iodide has a melting point of 158° C. In other examples, a contemplated ionic liquid is liquid (molten) at or below a temperature of about 120° C. and above a temperature of about minus 44° C. In some examples, a suitable ionic liquid can be liquid (molten) at a temperature of about minus 10° C. to about 100° C. The ionic liquids can also comprise Fe(III) anions, as will be discussed below.

An ionic liquid as disclosed herein can have an extremely low vapor pressure and typically decomposes prior to boiling. Exemplary liquification temperatures (i.e., melting points (MP) and glass transition temperatures ($T_g$)) and decomposition temperatures for illustrative N,N-1,3-di-$C_1$-$C_6$-alkyl imidazolium ion-containing ionic liquids wherein one of $R^1$ and $R^2$ is methyl are shown in Table 1 below.

TABLE 1

| Ionic Liquid | Liquification Temperature (° C.) | Decomposition Temperature (° C.) | Citation* |
|---|---|---|---|
| [$C_2$mim] Cl | | 285 | a |
| [$C_3$mim] Cl | | 282 | a |
| [$C_4$mim] Cl | 41 | 254 | b |
| [$C_6$mim] Cl | −69 | 253 | |
| [$C_8$mim] Cl | −73 | 243 | |
| [$C_2$mim] I | | 303 | a |
| [$C_4$mim] I | −72 | 265 | b |

TABLE 1-continued

| Ionic Liquid | Liquification Temperature (° C.) | Decomposition Temperature (° C.) | Citation* |
|---|---|---|---|
| [$C_4$mim] [$PF_6$] | 10 | 349 | b |
| [$C_2$mim] [$PF_6$] | 58-60 | 375 | c, a |
| [$C_3$mim] [$PF_6$] | 40 | 335 | a |
| [i$C_3$mim] [$PF_6$] | 102 | | a |
| [$C_6$mim] [$PF_6$] | −61 | 417 | d |
| [$C_4$mim] [$BF_4$] | −81 | 403, 360 | d, e |
| [$C_2$mim] [$BF_4$] | | 412 | a |
| [$C_2$mim] [$C_2H_3O_2$] | 45 | | c |
| [$C_2$mim] [$C_2F_3O_2$] | 14 | About 150 | f | a) Ngo et al., *Thermochim Acta* 2000, 357: 97.
b) Fanniri et al., *J Phys Chem* 1984, 88: 2614.
c) Wilkes et al., *Chem Commun* 1992, 965.
d) Suarez et al., *J Chim Phys* 1998, 95: 1626.
e) Holbrey et al., *J Chem Soc, Dalton Trans* 1999, 2133.
f) Bonhote et al., *Inorg Chem* 1996, 35: 1168.

Illustrative 1-alkyl-3-methyl-imidazolium ionic liquids, [$C_n$-mim]X, where n=4 and 6, X=$Cl^-$, $Br^-$, $SCN^-$, ($PF_6$)$^-$, ($BF_4$)$^-$ have been prepared. The dissolution of cellulose (fibrous cellulose, from Aldrich Chemical Co.; Milwaukee, Wis.) in those illustrative ionic liquids under ambient conditions and with heating to about 100° C., with sonication and with microwave heating has been examined. Dissolution is enhanced by the use of microwave heating. Cellulose solutions can be prepared very quickly, which is energy efficient and provides associated economic benefits.

A suitable anion for a contemplated ionic liquid cation is a halogen (fluoride, chloride, bromide, or iodide), perchlorate, a pseudohalogen such as thiocyanate and cyanate or $C_1$-$C_6$ carboxylate. Pseudohalides are monovalent and have properties similar to those of halides (Schriver et al., *Inorganic Chemistry*, W. H. Freeman & Co., New York, 1990, 406-407). Pseudohalides include the cyanide (CN), thiocyanate ($SCN^-$), cyanate ($OCN^-$), fulminate ($CNO^-$), and azide ($N_3^-$) anions. Carboxylate anions that contain 1-6 carbon atoms ($C_1$-$C_6$ carboxylate) and are illustrated by formate, acetate, propionate, butyrate, hexanoate, maleate, fumarate, oxalate, lactate, pyruvate, and the like. Still other examples of anions that can be present in the disclosed compositions include, but are not limited to, persulfate, sulfate, sulfites, phosphates, phosphites, nitrate, nitrites, hypochlorite, chlorite, perchlorate, bicarbonates, and the like, including mixtures thereof.

As briefly discussed above, the ionic liquid disclosed herein can also comprise a catalyst for catalyzing the polymerization of the conductive polymer precursor. Thus, in some aspects, the ionic liquid comprises a disclosed cation together with an anion comprising a catalytic form of a transition metal. In a specific aspect, the anion can comprise Fe(III). A specific non-limiting example of such an ionic liquid is 1-ethyl-3-methylimidazolium tetrachloroferrate, [$C_2$min][$FeCl_4$], which has the following structure:

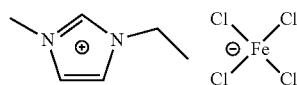

In other examples the anion comprises copper(II), silver(I), iron(II), nickel(II), zinc(II), manganese(II), or persulfate.

The catalytic ionic liquids, such as those comprising a transition metal, can be prepared by reacting one or more of the disclosed ionic liquids to exchange or react the anion with a transition metal species to form an ionic liquid comprising a transition metal anion. For example, a Cl containing ionic liquid can be reacted with iron(III) chloride hexahydrate to form an ionic liquid having a cation and a $FeCl_4$ anion. Another example includes a Cl containing ionic liquid that can be reacted with either silver(I) chloride or copper(II) chloride to form an ionic liquid having a cation and a $AgCl_2$ anion or $CuCl_4$ anion, respectively. Further examples include a Cl containing ionic liquid undergoing a metathesis reaction with a persulfate salt to form an ionic liquid having a cation and a persulfate anion. For the catalytic ionic liquids, the cation to anion molar ratio can be any suitable ratio. Exemplary ratios include without limitation 1:1, 2:1, and 1:2 cation:anion.

As discussed above, the disclosed ionic liquids can dissolve the electrically resistive material and/or serve as a medium for preparing the conductive polymer. A variety of hard-to-dissolve materials such as natural fibers can be dissolved in high concentration in ionic liquids by heating to about 100° C. (e.g., by heating to about 80° C.) in an ultrasonic bath, and most effectively by using microwave heating of the samples using a domestic microwave oven. Using a microwave heater, the admixture of ionic liquid and electrically resistive material can be heated to a temperature of about 100° C. to about 150° C.

Methods

Also disclosed are methods for preparing the composites and compositions. The composites can be made by immersing the electrically resistive material into the ionic liquid. Preferably, the electrically resistive material can be immersed into an ionic liquid that is catalytic, such as an ionic liquid comprising Fe(III). The electrically resistive material can either be removed from the ionic liquid or can remain in the ionic liquid and this solution can be used as the medium for polymerizing the conductive polymer precursor. In one example, the electrically resistive material can be removed from the catalytic ionic liquid and dried, such that residual catalytic ionic liquid remains on the electrically resistive material. Then, the electrically resistive material can be place into a solution of conductive polymer precursor. The catalytic ionic liquid on the electrically resistive material can then polymerized the conductive polymer precursor to thereby form the composite.

Thus, in one aspect, the composites can be prepared by a) contacting an electrically resistive material with an ionic liquid having at least one cation and at least one anion comprising Fe(III) under conditions effective to cause absorption of the Fe(III) onto at least a portion of the electrically resistive material; and b) contacting the electrically resistive material with a monomer solution having a conductive polymer precursor for a time sufficient to polymerize the polymer precursor into a conductive polymer, thereby forming the conductive composite.

A variety of processing conditions can be used with the methods disclosed herein. For coating the electrically resistive material with Fe(III) using the ionic liquid, the coating time can range from about 5 minutes to about 20 minutes, including for example about 10 or about 15 minutes. Any number of coating cycles can be used, for example, three cycles wherein the material is immersed in the ionic liquid, removed, then re-immersed as desired. Such a process allows for a suitable amount of Fe(III) to be coated onto the material, thereby making the material catalytically active, prior to polymerizing the monomer with the material.

Following the coating of the electrically resistive material with the Fe(III), the material can then contact a monomer solution comprising a conductive polymer precursor. Depending on the desired composite, the material can remain in the monomer solution for a number hours, such as 24 hours or more, to ensure polymerization of the polymer precursor. In preferred aspects, the polymer precursor comprises pyrrole and thus the conductive polymer comprises polypyrrole.

Uses

A variety of uses exist for the disclosed composites. For example, the electrically conductive fabrics can be used in filtration, electro-magnetic interference shielding, electronic devices, conductive substrates for organic electronic devices, battery applications, and special purpose clothing. It will be appreciated that the disclosed processes and compositions allow for inexpensive, renewable cellulose or cotton to be incorporated into current conductive fabrics industry dominated by the use of petroleum-based polymer materials.

EXAMPLES

The following examples are set forth below to illustrate the methods and results according to the disclosed subject matter. These examples are not intended to be inclusive of all aspects of the subject matter disclosed herein, but rather to illustrate representative methods and results. These examples are not intended to exclude equivalents and variations of the present invention which are apparent to one skilled in the art.

Efforts have been made to ensure accuracy with respect to numbers (e.g., amounts, temperature, etc.) but some errors and deviations should be accounted for. Unless indicated otherwise, parts are parts by weight, temperature is in ° C. or is at ambient temperature, and pressure is at or near atmospheric. There are numerous variations and combinations of reaction conditions, e.g., component concentrations, temperatures, pressures and other reaction ranges and conditions that can be used to optimize the product purity and yield obtained from the described process. Only reasonable and routine experimentation will be required to optimize such process conditions.

Materials & Chemicals

Commercially available 100% cotton thread (Gütermann—CA 02776) and 100% viscose thread (Sulky—CA 45688) were purchased locally. Pyrrole monomer and iron (III) chloride hexahydrate ($FeCl_3.6H_2O$) were obtained from Aldrich (Milwaukee, Wis.). 1-ethyl-3-methylimidazolium chloride ([$C_2$mim]Cl) was provided by BASF Corporation (Ludwigshafen, Germany). Concentrated sulfuric acid was obtained from Fisher Scientific (Fair Lawn, N.J.). All chemicals and materials were used as received. Deionized water was used throughout and obtained from a commercial in-house deionizer.

Example 1

Synthesis of 1-ethyl-3-methylimidazolium tetrachloroferrate, [$C_2$mim][$FeCl_4$]

Synthesis of 1-ethyl-3-methylimidazolium tetrachloroferrate was carried out similar to previously reported methods for 1-butyl-3-methylimidazolium tetrachloroferrate [Sitze, M. S.; Schreiter, E. R.; Patterson, E. V.; Freeman, R. G., "Ionic Liquids Based on $FeCl_3$ and $FeCl_2$ Raman Scattering and ab Initio Calculations," Inorganic Chemistry, 40: 2298-2304, 2001]. The iron(III) chloride hexahydrate and [$C_2$mim]Cl were weighed out in stoichiometric ratios of 1:1, 2:1, and 1:2 mole ratio and placed in a beaker. The beaker was then put in an oven at 90° C. for 30 min after which near quantitative exclusion of water from the IL-metal chloride salt was observed. The [$C_2$mim][$FeCl_4$] solution was poured into a reparatory funnel for ease of separation of the 1-ethyl-3- methylimidazolium tetrachloroferrate bottom phase. The water-rich top phase was discarded.

Example 2

Absorption of [C2mim][FeCl$_4$] into Fiber

The Gütermann's pure cotton thread or Sulky's viscose thread were weighed prior to [C$_2$mim][FeCl$_4$] impregnation. For adequate immersion, slits were made in straws of about 4 mm o.d. using a razor. One slit was cut at the top of the straw in a vertical direction, while the other was sliced about 2.5-3 cm from the top of the straw in the horizontal direction. These slits facilitated in holding the fiber surrounding the straw. A 15.24 cm cotton fiber was fitted in the slits and loosely wrapped in the 2.5-3 cm length of the straw.

3 mL of [C$_2$mim][FeCl$_4$] was added to several test tubes after which the straws with fibers were placed inside. A test tube rack containing the test tubes with straws were placed in a New Brunswick Scientific C25 Incubator Shaker (Edison, N.J.) which was preset at 22° C. and shaken at 100 rpm. Cellulose fibers were removed at time intervals of 1, 5, 10, 15, and 30 min. Further studies were also conducted for the Gütermann cellulose fiber in which the temperature was adjusted to 30, 40, or 50° C. by the shaker, as well as using ILs prepared with 1:2 and 2:1 molar ratios of [C$_2$mim]Cl and FeCl$_3$.6H$_2$O.

Example 3

Multiple Fiber Absorption of [C2mim][FeCl$_4$]

In addition to single Fe(III) absorption studies, a multiple use fiber study was performed. 5 mL of IL was transferred to a test tube. Gütermann fibers of 30.48 cm were placed on a straw length of 4 cm. The straw was placed in the IL solution for 1 h. The weight was recorded. The second straw was then placed in the same IL solution for another hour. The weight was recorded. The same process was followed for a 10 multiple fiber study to observe the maximum amount of iron(III) that could be absorbed from the solution.

Example 4

Atomic Absorption Analysis of Iron(III)

Samples were prepared for atomic absorption testing using a PerkinElmer A400 Analyst Atomic Absorption Spectrophotometer (AAS). The entire fiber samples were weighed and then tightly packed at the bottom of test tubes. Samples were then treated with 1 mL of sulfuric acid. The cellulose fiber impregnated with [C$_2$mim][FeCl$_4$] dissolved into solution. Next, this solution was diluted to 50 mL with deionized water. Samples were quantitatively analyzed for Fe(III) by AAS using a standard calibration curve. Blanks and controls were prepared using cellulose fibers.

Example 5

Pyrrole Polymerization

Pyrrole polymerization was carried out on fibers immersed for 15 min at 22° C. in 1:1 molar ratio [C$_2$mim][FeCl$_4$]. These constraints were used for efficiency but, moreover, for the reason that iron absorption seemed to be highest at 15 min. After 15 min of absorption for the 15.24 cm fibers, they were removed and remained wrapped on the straws. The fibers were patted dry using a paper towel so no iron chloride or IL residue remained on the fibers. Then, fibers were placed in pyrrole solutions of various concentrations for 24 h. The different solutions of pyrrole and water used were 0.1% and 5% pyrrole. After soaking in pyrrole solution, the straw intact fibers were removed and soaked in distilled water for 3 min so any excess polypyrrole (FIG. 2) on the surface was removed. Fibers were finally removed from the straw and then dried.

Example 6

TEM Optical Imaging

Transmission Electron Microscopy was performed on both treated and untreated Gütermann cotton fibers. Desiccated samples were embedded in Spurr's low viscosity resin for 8 hours under vacuum then polymerized overnight at 70° C. Blocks were trimmed and 92 nm thick sections cut on Leica EM UC6 Ultramicrotome using a diamond knife. Samples were placed on 0.5% Formvar coated slot grids and visualized on a Hitachi H7650 TEM using 60 kV of acceleration voltage. Photographs were obtained using an AMT Digital Camera.

Example 7

Electrical Resistance Measurement

Resistance was recorded using a Fluke 112 (Everett, Wash.) multimeter. One end was placed in the beginning of the fiber and the other 1 cm away. The resistance was then recorded.

Example 8

Mechanical Properties

The strength, modulus, and failure strain data were determined from the stress strain plot using an electrical motor driven MTS Q-Test 25 testing machine. A special pneumatic clamping device was used for clamping the specimens and a load cell of 5 lbs was used in the testing machine. The test was carried out at a crosshead speed of 0.127 cm/min. The gauge length of the fiber was maintained at 7.62 cm.

Example 9

Polypyrrole-Coated Nylon

A nylon filter disk (Sterlitech Corp.; 47 mm, 20 μm) was soaked in 1-ethyl-3-methylimidazolium tetrachloroferrate for 30 min. The filter was removed from IL and excess IL removed by paper towel. Next, the IL soaked filter was immersed in 2% v/v pyrrole dissolved in D.I. water for two hours. The filter was removed and washed several times with 300 mL D.I. water and air dried. Resistance of dried filter at 1 cm: 5 kiloohms.

Example 10

Polypyrrole-Coated Polyaramid

A polyaramid mat (KEVLAR™; 5 cm×5 cm) was soaked in 1-ethyl-3-methylimidazolium tetrachloroferrate for 30 min and patted dry with a paper towel to remove excess IL. The IL soaked polyaramid was next immersed in 2% v/v pyrrole dissolved in D. I. water overnight. The black polypyrrole-coated mat was removed and washed several times with D.I. water and air dried. The mat has a measurable resistance at 1 cm: 300 ohms.

Example 11

Polypyrrole-Coated Polyester

A polyester thread (Coats & Clark 100% polyester covered polyester; 30 cm) was soaked in 5 mL of 1-ethyl-3-methylimidazolium tetrachloroferrate for one hour, removed, and patted dry with paper towel to remove excess IL. The IL soaked thread was then placed in 5 mL of 50 µL pyrrole dissolved in 5 mL D.I. water for 72 hours. The thread was removed and rinsed D.I. water, wiped with a paper towel, and allowed to air dry. The polypyrrole-coated thread has a measurable resistance at 1 cm: 1 megaohm.

Example 12

Extruded Conductive Cellulose-Polypyrrole Fiber Blends

Microcrystalline cellulose (MCC; 1.39 g) was dissolved in 1-ethyl-3-methylimidazolium chloride (8.54 g) at 90° C. and vortexing. Next, was added 1-ethyl-3-methylimidazolium tetrachloroferrate (0.5 g) to the cellulose-IL solution. The solution was transferred to a syringe and extruded into 80 mL of D. I. water containing pyrrole (0.1 g). The extruded fibers turned completely black in ten min. Extruded fibers were soaked overnight in D.I. water and washed several times then air dried. The cellulose-polypyrrole fiber blend has a measurable resistance at 1 cm: 1.4 megaohms.

Example 13

Extruded Conductive Cellulose-Poly-N-methylpyrrole Fiber Blends

MCC (1.24 g) was dissolved in 1-ethyl-3-methylimidazolium chloride (9.08 g) at 90° C. and vortexing. Next, was added 1-ethyl-3-methylimidazolium tetrachloroferrate (1.0 g) and N-methylpyrrole (0.5 g). The solution was transferred by syringe and extruded into D.I. water. Fibers were allowed to soak overnight, washed several times with D.I. water then air dried. The cellulose-poly-N-methylpyrrole fiber blend has a measurable resistance at 1 cm: 70 kiloohms.

Example 14

Polypyrrole-Coated Filter Paper as Electrode Material

A filter paper (Whatman) coated with polypyrrole as described above was coupled with aluminum foil. Another 1-ethyl-3-methylimidazolium chloride soaked filter paper (Whatman) was sandwiched between the polypyrrole-coated filter paper and aluminum foil creating and Aluminum-air battery of ~1V.

Results and Discussion

With reference to FIG. 1, when absorption was measured as a function of time, absorption had a relative peak around 10 min with Fe(III) absorption of 65 mg/g. This value is a significant improvement in time needed and Fe(III) absorbed over currently known processes. Absorption of Fe(III) appears to peak then decline after 10 min for the Gütermann cotton thread. Accuracy was measured as the average of at least three measurements. Fifteen min conditioning times for [C2mim][FeCl$_4$] for cotton and viscose provide good results.

Figure 2:
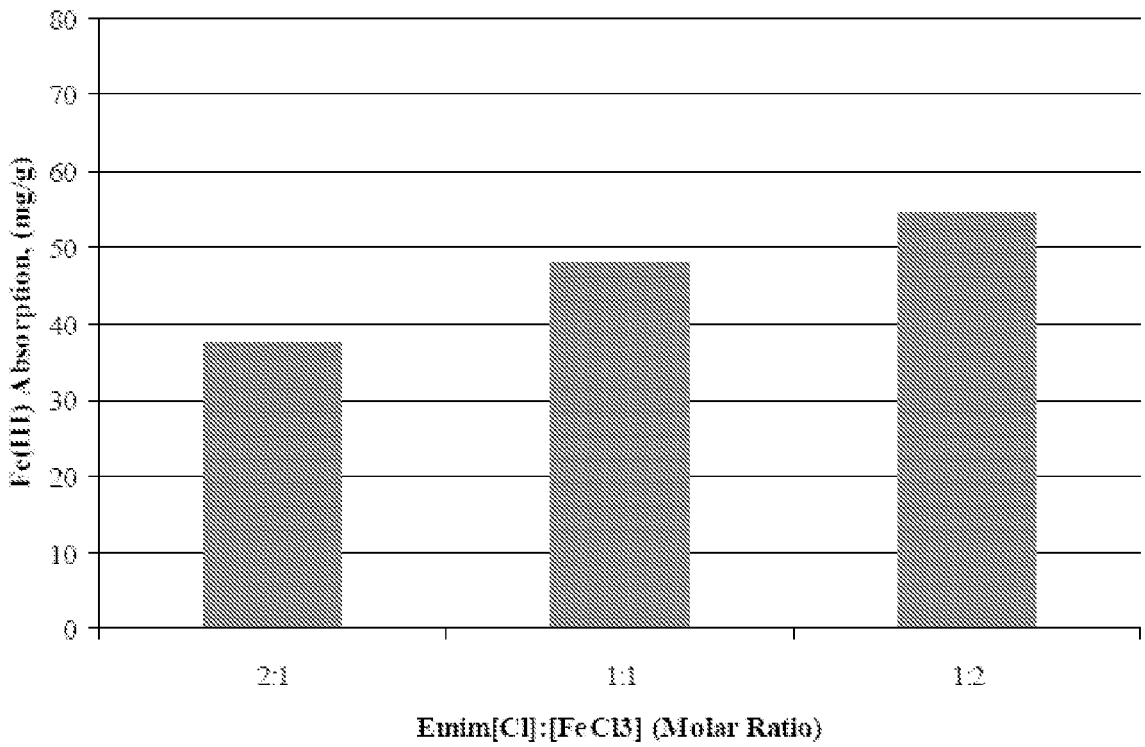
FIG. 2 is a bar graph of Fe(III) absorption of cotton thread from differing molar ratio of $[C_2mim]Cl$ and $FeCl_3 \cdot 6H_2O$ at 22° C. and 15 minutes.

The molar ratio also had an effect on the Fe(III) absorption to the cotton thread. As seen in FIG. 2, as the ratio between iron chloride and IL was increased, the amount of Fe(III) absorbed also increased. Without wishing to be bound by theory, the results indicate that the molar ratio of [C$_2$mim]Cl and FeCl$_3$.6H$_2$O used to prepare the [C$_2$mim][FeCl$_4$] ionic liquid leads to variable concentrations of Fe(III) available for subsequent reaction with pyrrole monomer.

A series of ten Gütermann cotton fibers were conditioned using the same [C2mim][FeCl$_4$] solution at 22° C. and 1 hour (data not shown). The amount of Fe(III) absorbed showed no significant decrease for the first three cotton fibers conditioned. The fourth cotton fiber conditioned in the same [C$_2$mim][FeCl$_4$] resulted in a 23% decrease in the amount of absorbed Fe(III). Absorption of Fe(III) steadily decreased over the remaining cotton threads conditioned with the 10th cotton thread resulting in a 60% decrease in Fe(III) absorption.

Figure 3:
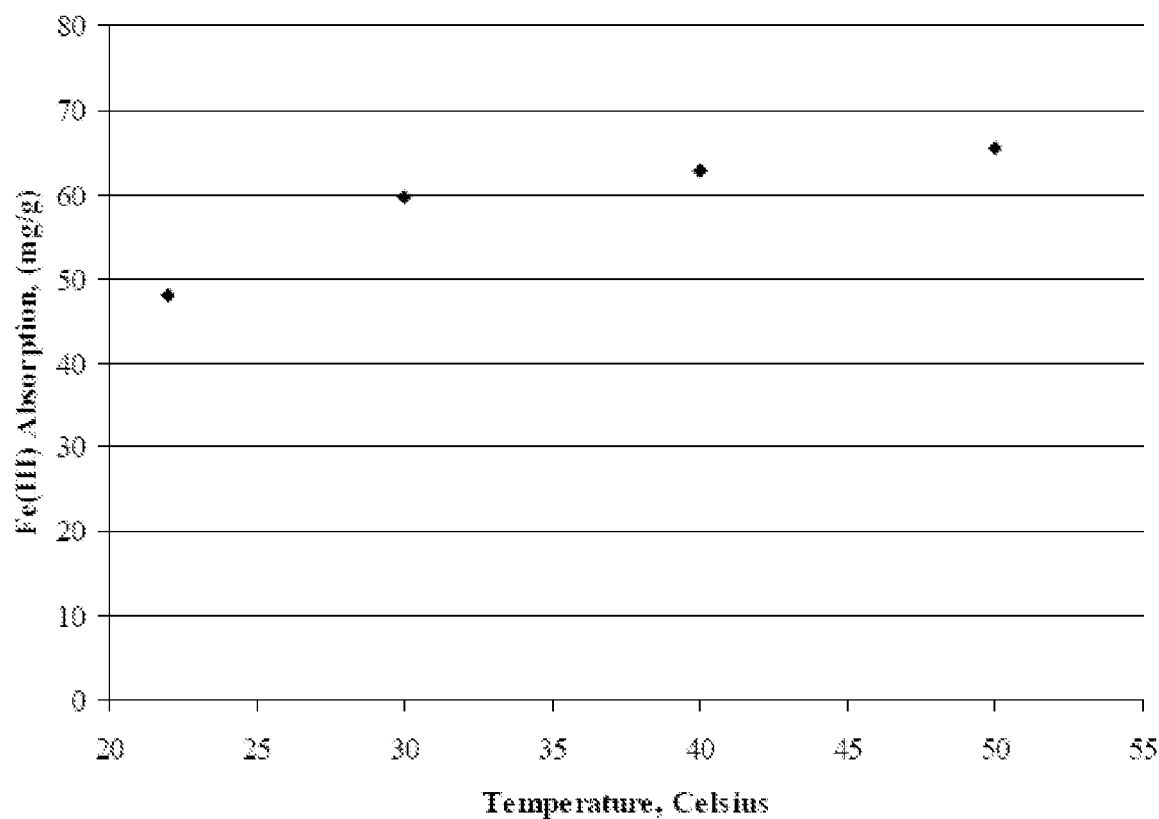
FIG. 3 is a plot of Fe(III) absorption of cotton thread versus temperature and 15 minutes conditioning.

Temperature has an effect on Fe(III) absorption. FIG. 3 plots the Fe(III) absorption versus temperature for cotton threads conditioned in [C$_2$mim][FeCl$_4$] for 15 min. It was observed that as temperature increased, the Fe(III) absorption increased as one would expect. Increases in temperature resulted in an increase in absorption primarily through increased diffusion mass transfer of the [C$_2$mim][FeCl$_4$] into the cotton thread.

Figure 4A:
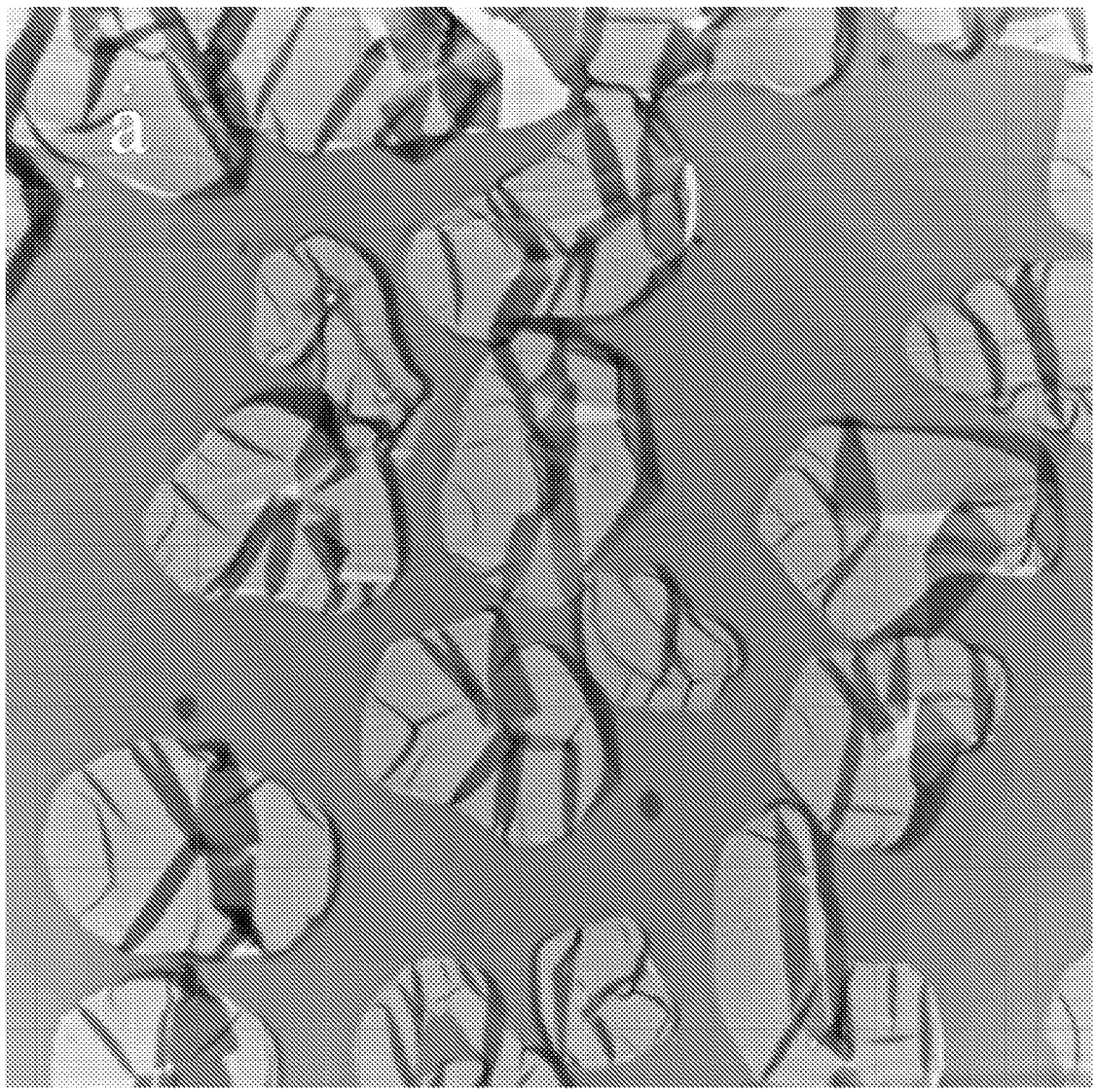
FIGS. 4A-D are TEM images of Gütermann cotton thread: without polypyrrole at a) 3000× and b) 50,000× magnification and with polypyrrole at c) 3000× and d) 50,000× magnification.
Figure 4B:
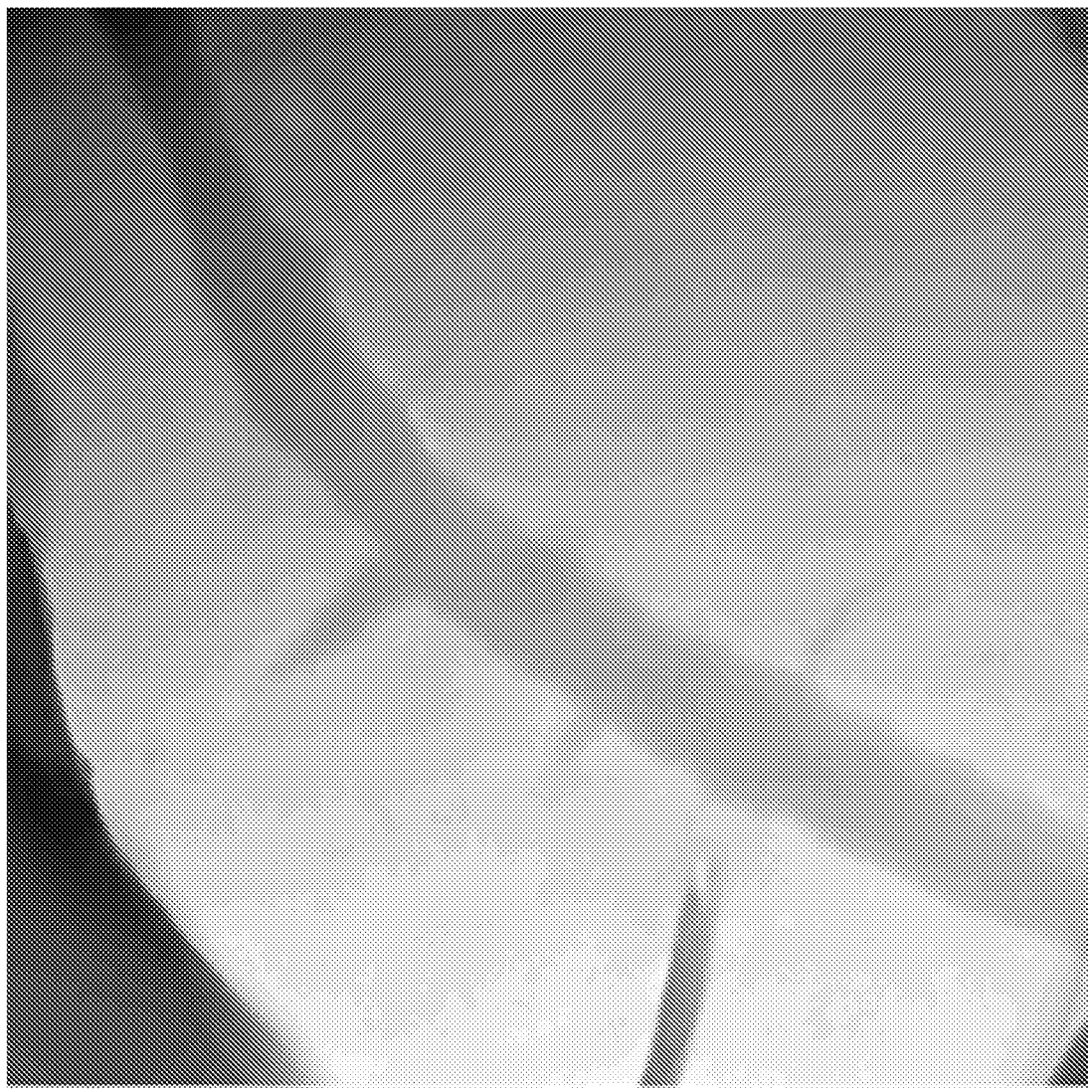
Figure 4C:
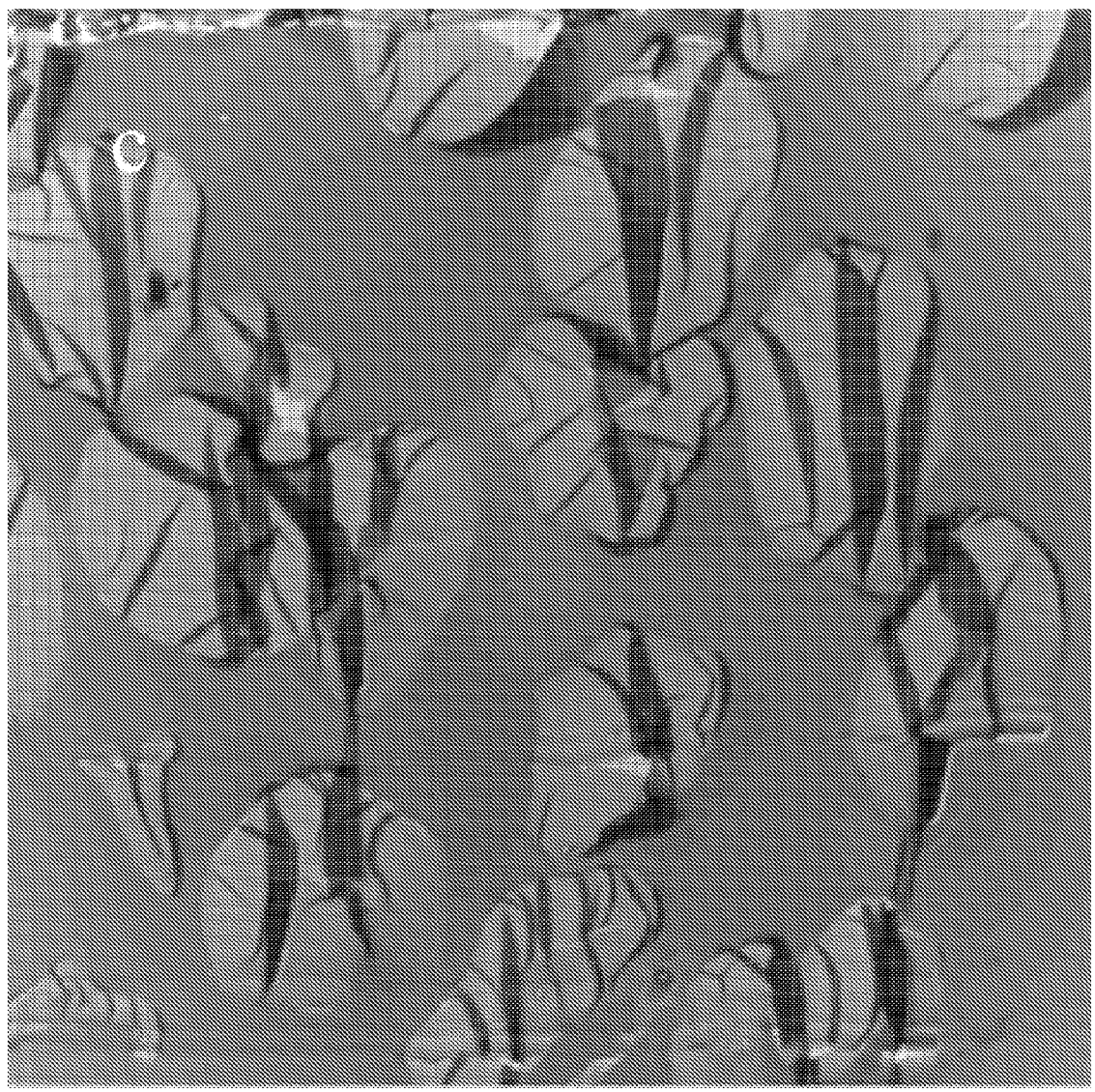
Figure 4D:
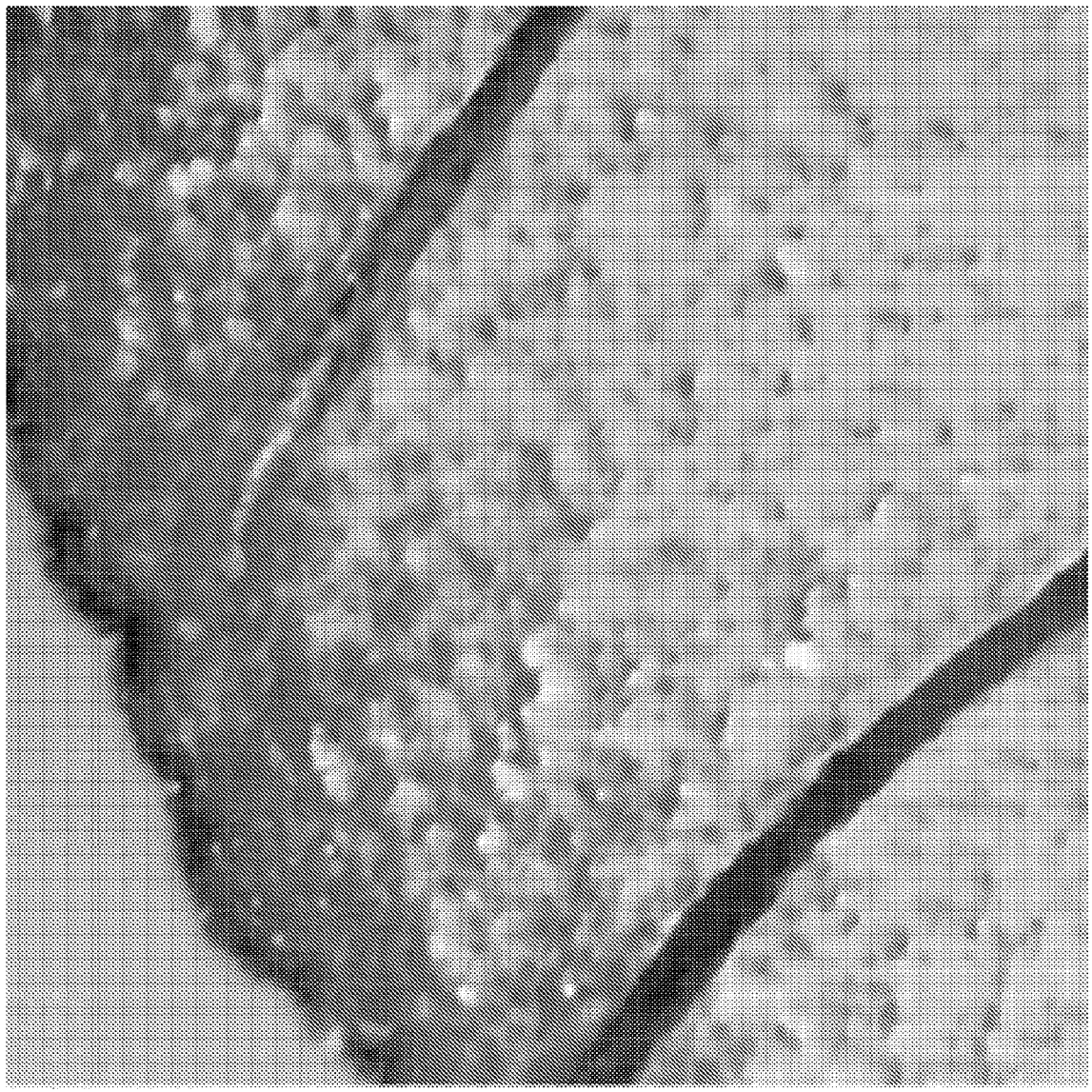

The cross-sectional views of untreated and polypyrrole-coated Gütermann cotton thread are shown in FIGS. 4A-D. FIGS. 4A and 4B are indicative of commercially available mercerized cotton fibers [Rochow, T. G.; Tucker, P. A. Introduction to Microscopy by Means of Light, Electrons, X Rays, or Acoustics; Springer: NY, 1994, pp 115.]. The cross sections have irregular sizes and there appears to be dark regions or patches that resemble cliffs or valleys which are believed to be caused by wrinkling during TEM sample preparation. These regions were present within all samples imaged.

Polypyrrole nano particles appear as black flecks on the surface and within the cotton fiber (FIG. 4). Without wishing to be bound by theory, the formation of these nanosized polypyrrole particles and controlled dispersion can assist in improving mechanical properties of polypyrrolecellulose fiber composites. Cross sections of polypyrrole-cotton composites (FIG. 4) shows greater accumulation of nanoscale structures of polypyrrole at the edges with varying sizes of nanoparticles within the interior of the fiber. It can be seen in FIG. 6D that about 90% of the polypyrrole nanoscale structures are on the edge of the cotton fiber.

Resistance values at 1 cm for polypyrrole-cotton composites showed a marked decrease as the pyrrole monomer concentration was increased (see Table 2). Increasing pyrrole monomer resulted in more polypyrrole as evidenced by the black covering of polypyrrole on the cotton fibers. The polypyrrole-cotton composites prepared from 0.1% pyrrole had a grey color indicating regions on the cotton thread having less polypyrrole, whereas the polypyrrole-cotton composite prepared using 5% pyrrole was completely black.

TABLE 2

| | Pyrrole Concentration | |
|---|---|---|
| | 0.1% | 5% |
| Resistance (kΩ) at 1 cm | 1518 | 2.99 |

*Experimental conditions: fibers immersed for 15 min at 22° C. in 1:1 molar ratio [C$_2$mim][FeCl$_4$], polymerization time = 24 hours.

Figure 5:
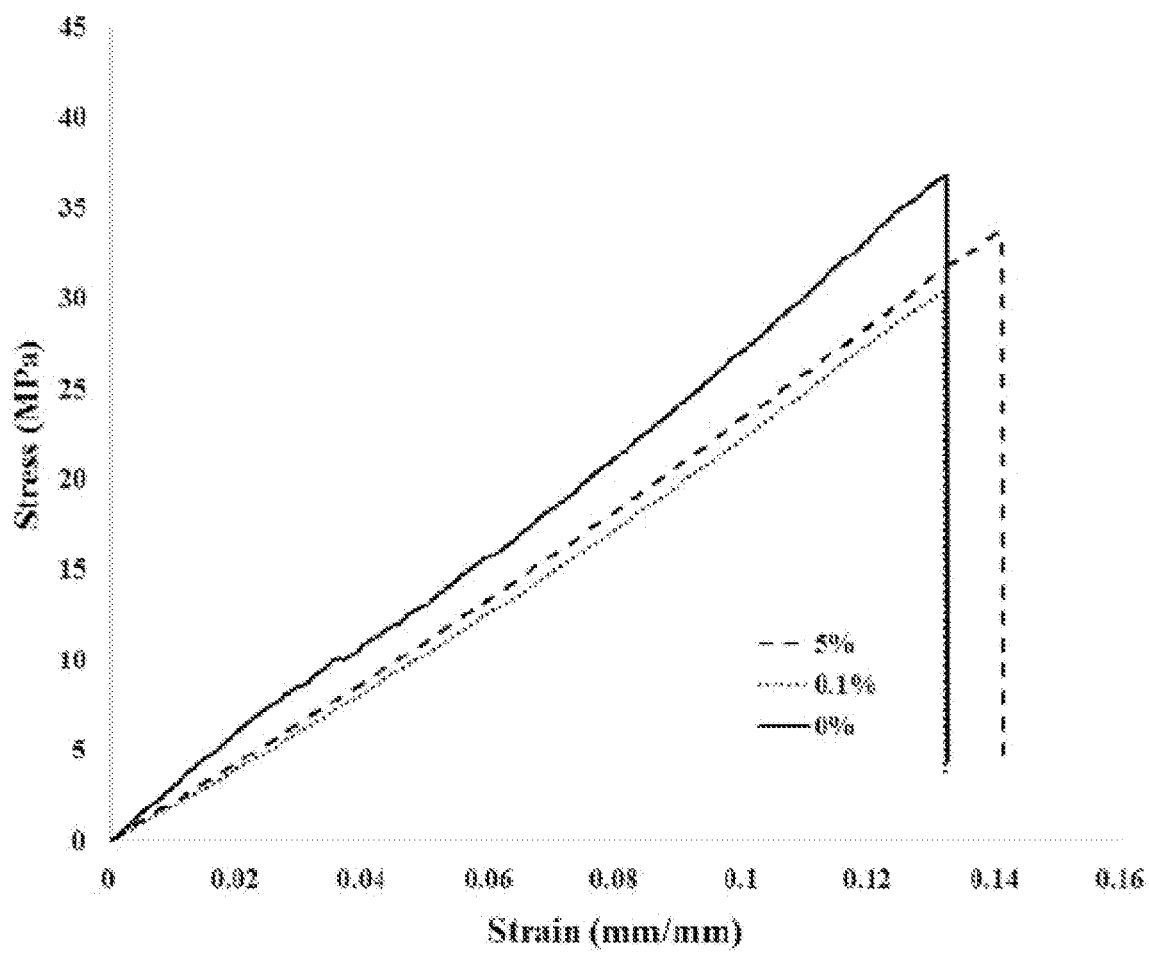
FIG. 5 is a plot of stress-strain curves for Gütermann cotton thread treated with pyrrole solutions of 0% (solid line), 0.1% (dotted line), and 5% (dashed line).

The stress-strain plots for cotton thread prepared with differing amounts of pyrrole in solution are shown in FIG. 5 and the corresponding data are provided in Table 3. According to these experiments, degradation in mechanical properties is relatively small after coating.

TABLE 3

|  | Pyrrole Concentration | | |
| --- | --- | --- | --- |
|  | 0% | 0.1% | 5% |
| Modulus (MPa) | 271.31 | 230.46 | 239.82 |
| Ultimate Stress (MPa) | 36.60 | 30.13 | 33.46 |
| Failure Strain (%) | 13.06 | 13.00 | 14.0 |

*Experimental conditions: fibers immersed for 15 minutes at 22° C. in 1:1 molar ration [C$_2$mim][FeCl$_4$], polymerization time = 24 hours.

Other advantages which are obvious and which are inherent to the invention will be evident to one skilled in the art. It will be understood that certain features and sub-combinations are of utility and may be employed without reference to other features and sub-combinations. This is contemplated by and is within the scope of the claims. Since many possible embodiments may be made of the invention without departing from the scope thereof, it is to be understood that all matter herein set forth or shown in the accompanying drawings is to be interpreted as illustrative and not in a limiting sense.

What is claimed is:

1. A process for preparing a conductive composite, comprising:
   a) contacting an electrically resistive material with an ionic liquid having at least one cation and at least one anion that comprises a transition metal, thereby producing a treated electrically resistive material where the anion is absorbed, adsorbed, or both onto at least a portion of the electrically resistive material; and
   b) contacting the treated electrically resistive material with a monomer solution comprising a conductive polymer precursor to polymerize the polymer precursor into a conductive polymer, thereby forming the conductive composite.

2. The process of claim 1, wherein the electrically resistive material comprises a fiber.

3. The process of claim 1, wherein the electrically resistive material comprises cellulose.

4. The process of claim 1, wherein the electrically resistive material comprises a cotton fiber.

5. The process of claim 1, wherein the electrically resistive material comprises silk or wool.

6. The process of claim 1, wherein the electrically resistive material comprises nylon, polyaramide, or polyester.

7. The process of claim 1, wherein the electrically resistive material is contacted with the ionic liquid for a time from about 10 to about 20 minutes prior to contacting the treated electrically resistive material with the monomer solution.

8. The process of claim 1, wherein the at least one cation and the at least one anion are present in a molar ratio of about 1:1.

9. The process of claim 1, wherein the at least one anion comprises Fe(III).

10. The process of claim 1, wherein the at least one anion comprises Ni(II), Zn(II), Mn(II), Cu(II), or Ag(I).

11. The process of claim 1, wherein the at least one-anion is [FeCl$_4$]$^-$.

12. The process of claim 1, wherein the at least one cation comprises a compound having a formula:

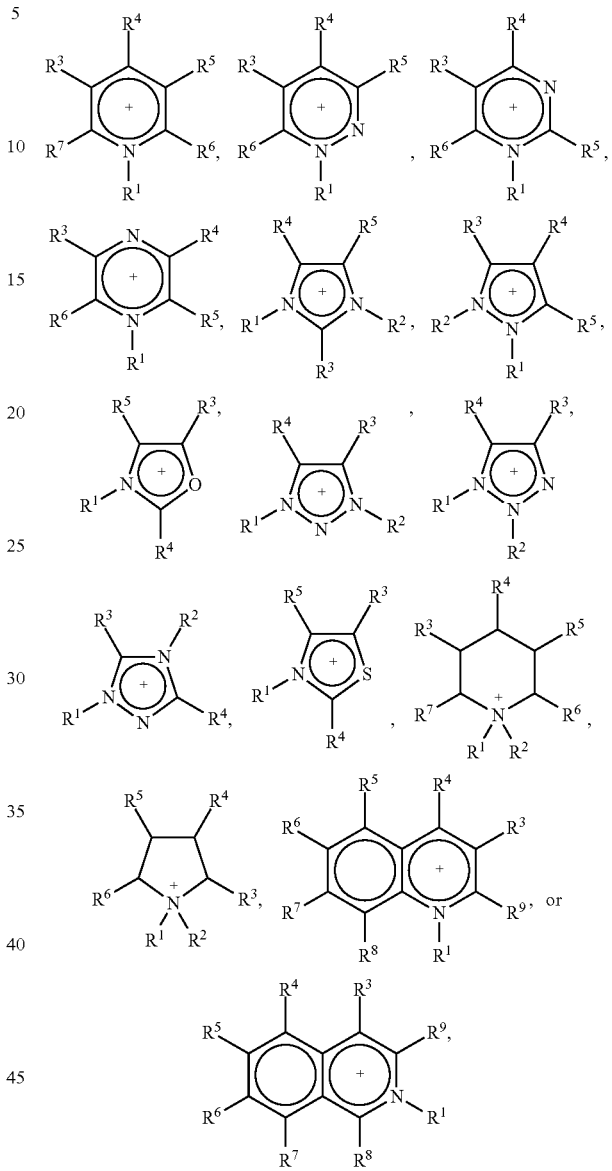

wherein $R^1$ and $R^2$ are independently a $C_1$-$C_6$ alkyl group or a $C_1$-$C_6$ alkoxyalkyl group, and $R^3$, $R^4$, $R^5$, $R^6$, $R^7$, $R^8$, and $R^9$ are independently H, a $C_1$-$C_6$ alkyl, a $C_1$-$C_6$ alkoxyalkyl group, or a $C_1$-$C_6$ alkoxy group.

13. The process of claim 1, wherein the at least one cation comprises a compound having a formula:

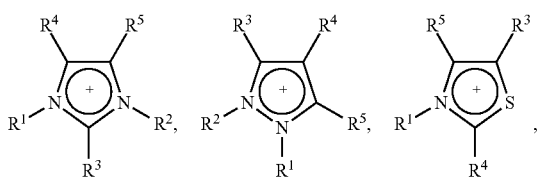

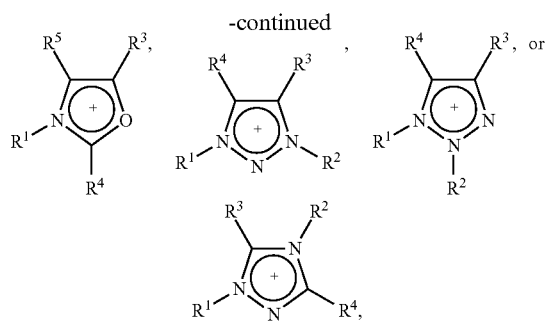

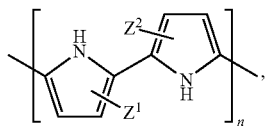

wherein $R^1$ and $R^2$ are independently a $C_1$-$C_6$ alkyl group or a $C_1$-$C_6$ alkoxyalkyl group, and $R^3$, $R^4$, and $R^5$ are independently H, a $C_1$-$C_6$ alkyl group, a $C_1$-$C_6$ alkoxyalkyl group.

14. The process of claim 1, wherein the catalytic ionic liquid comprises 1-ethyl-3-methylimidazolium tetrachloroferrate ($[C_2mim][FeCl_4]$).

15. The process of claim 1, wherein the conductive polymer precursor comprises a compound having a pyrrole moiety.

16. The process of claim 1, wherein the conductive polymer precursor comprises pyrrole.

17. The process of claim 1, wherein the conductive polymer comprises a pyrrole residue.

18. The process of claim 1, wherein the conductive polymer comprises polypyrrole represented by the formula:

wherein n is an integer from 2 to 100,000, and $Z^1$ and $Z^2$ are independently selected from alkyl, alkenyl, alkynyl, alkoxy, amino, and halogen.

19. The process of claim 1, wherein the at least one cation and the at least one anion are present in a molar ratio of about 1:2.

20. The process of claim 1, wherein the at least one anion is $[AgCl_2]^-$.

21. The process of claim 1, wherein the conductive composite has a resistance of less than about 3 k$\Omega$ at 1 cm at room temperature.

22. The process of claim 1, wherein the conductive composite has a resistance of less than about 5 k$\Omega$ at 1 cm at room temperature.

23. The process of claim 1, where the at least one anion further comprises one or more of a halogen, perchlorate, pseudohalogen, or $C_1$-$C_6$ carboxylate.

24. The process of claim 1, wherein the treated electrically resistive material is removed from the ionic liquid before step b).

* * * * *